(12) United States Patent
Kuleschow et al.

(10) Patent No.: US 8,520,892 B2
(45) Date of Patent: Aug. 27, 2013

(54) METHOD AND APPARATUS FOR DETECTING OBJECTS

(75) Inventors: Andreas Kuleschow, Oberasbach (DE); Klaus Spinnler, Erlangen (DE); Christian Münzenmayer, Nuremberg (DE)

(73) Assignee: Fraunhofer-Gesellschaft zur Foerderung der Angewandten Forschung E., Munich (DE)

( * ) Notice: Subject to any disclaimer, the term of this patent is extended or adjusted under 35 U.S.C. 154(b) by 927 days.

(21) Appl. No.: 12/616,075

(22) Filed: Nov. 10, 2009

(65) Prior Publication Data
US 2010/0119113 A1 May 13, 2010

(30) Foreign Application Priority Data
Nov. 10, 2008 (DE) .......................... 10 2008 056 600

(51) Int. Cl.
*G06K 9/00* (2006.01)

(52) U.S. Cl.
USPC ......................................................... 382/103

(58) Field of Classification Search
None
See application file for complete search history.

(56) References Cited

PUBLICATIONS

Jiang, Xiaoyi; Mojon, D.; , "Adaptive local thresholding by verification-based multithreshold probing with application to vessel detection in retinal images," Pattern Analysis and Machine Intelligence, IEEE Transactions on , vol. 25, No. 1, pp. 131-137, Jan. 2003.*

Kuleschow, A. et al., "New Methods for Segmentation of Images Considering the Human Vision Principles." Computer Vision and Graphics, 1037-1042. 2006 Springer.*

Andreas Kuleschow et al: "A Fast Logical-Morophological Method to Segment Scratch—Type Objects" Computer Vision and Graphics, Springer Berlin Heidelberg, Berlin, Heidelberg LNCS 5337, Nov. 10, 2008, pp. 14-23.

Junfeng GE et al: "Adaptive Hysteresis Thresholding Based Pedestrian Detection in Nighttime Using a Normal Camera" Vehicular Electronics and Safety, 2005 IEEE International Conference on XI'AN China, Oct. 14-16, 2005 Piscataway, NJ, USA IEEE 14. pp 46-51.

Banhart (ED.) Ohser, Schladitz: "Visualization, Processing and Analysis of Tomographic Data"; Ch. 3 in "Advanced Tomographic Methods in Materials Research and Engineering", Mar. 20, 2008, Oxford University Press, Oxford, UK pp. 37, 56-57, 74-77.

Soille, Pierre: "Geodesic Transformations"; Ch. 6 in "Morphological Image Analysis" 1999, Springer Verlag Berlin Heidelberg, pp. 155-167.

(Continued)

*Primary Examiner* — Claire X Wang
*Assistant Examiner* — Thomas A James
(74) *Attorney, Agent, or Firm* — Michael A. Glenn; Perkins Coie LLP

(57) ABSTRACT

A method for detecting an object on an image representable by picture elements includes: "determining first and second adaptive thresholds for picture elements of the image, depending on an average intensity in a region around the respective picture element", "determining partial objects of picture elements of a first type that are obtained based on a comparison with the first adaptive threshold", "determining picture elements of a second type that are obtained based on a comparison with the second adaptive threshold" and "combining a first and a second one of the partial objects to an extended partial object by picture elements of the second type, when a minimum distance exists between the first and the second of the partial objects, wherein the object to be detected can be described by a sum of the partial objects of picture elements of the first type and/or the obtained extended partial objects".

32 Claims, 18 Drawing Sheets

(56) References Cited

PUBLICATIONS

Feng Jing et. al: "Unsupervised image segmentation using local homogeneity analysis" Proceedings of the 2003 IEEE International Symposium on Circuits and Systems; Bangkok, Thailand—May 25-28, 2003; IEEE International Symposium on Circuits and Systems, IEEE, US, vol. 2, Jan. 1, 2003 pp. 456-459.

Braga-Neto et al.: "Automatic target detection and tracking in forward-looking infrared image sequences using morphological connected operators"; Journal of Electronic Imaging; vol. 13 No. 4, Oct. 2004 pp. 802-813.

Raptis S.N. et al.; "Growing Region Technique in the Detection of Autonomous Structures Within X-Ray Radiographs" Nuclear Science Symposium, 1997 IEEE Albuquerque, NM, USA, Nov. 9-15, 1997, New York, NY, USA, vol. 2, pp. 1576-1580.

Andreas Kuleschow and Klaus Spinnler: "New Methods for Segmentation of Images Considering the Human Vision Principles" Computer Vision and Graphics: International Conference, ICCVG 2004; Warsaw, Poland, copyright Jan. 1, 2006, Springer, vol. 32, pp. 1037-1042.

Del Mastio, A et al.: "Virtual Restoration and Protection of Cultural Heritage Images", 2007 15th International Conference on Digital Signal Processing, IEEE, Jul. 1, 2007, pp. 471-474.

Tomoyuki Yamaguchi et al.: "Automated Crack Detection for Concrete Surface Image Using Percolation Model and Edge Information", IECON 2006—32nd Annual Conference on Industrial Electronics, IEEE, Piscataway, NJ, USA, Nov. 1, 2006, pp. 3355-3360.

\* cited by examiner

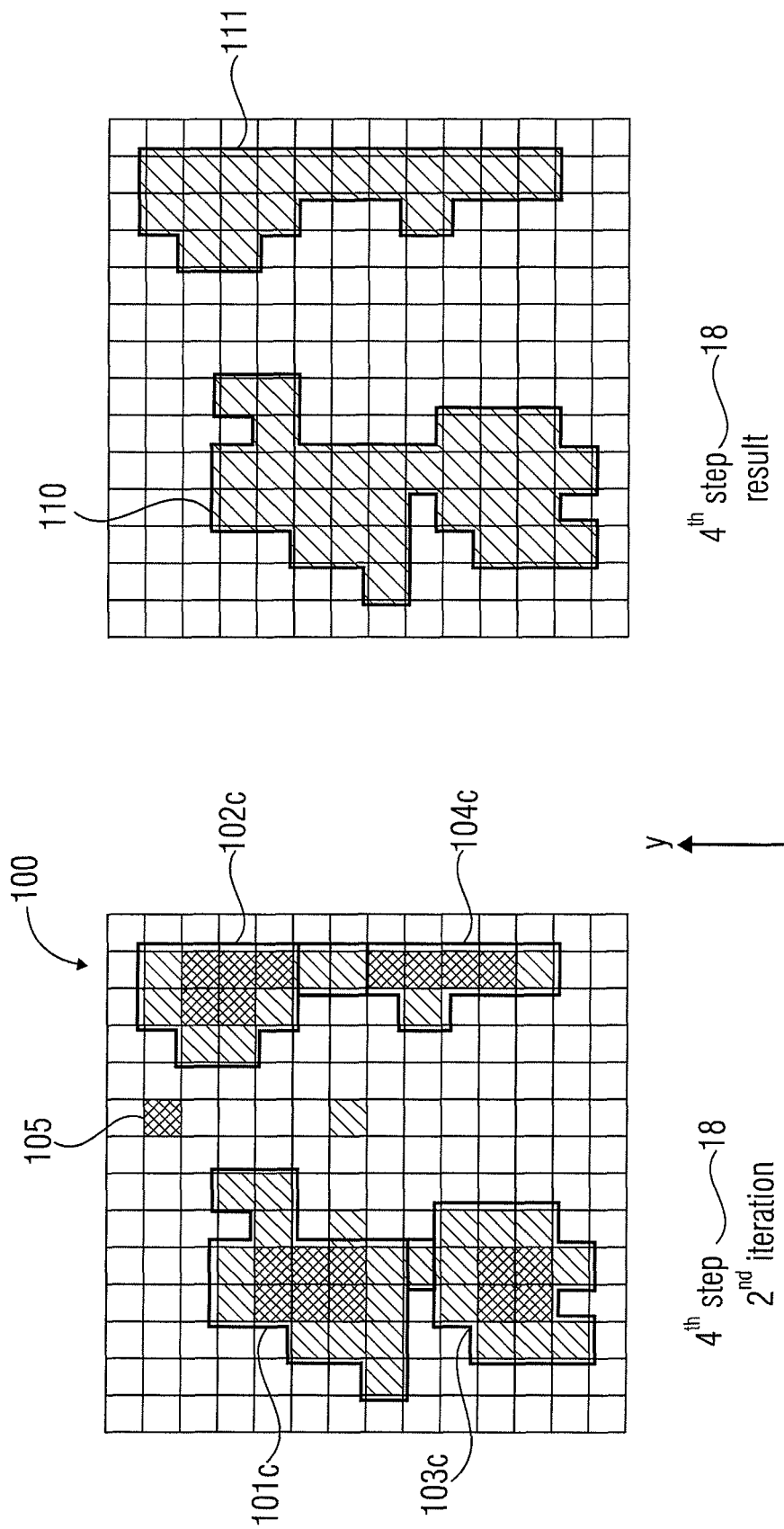

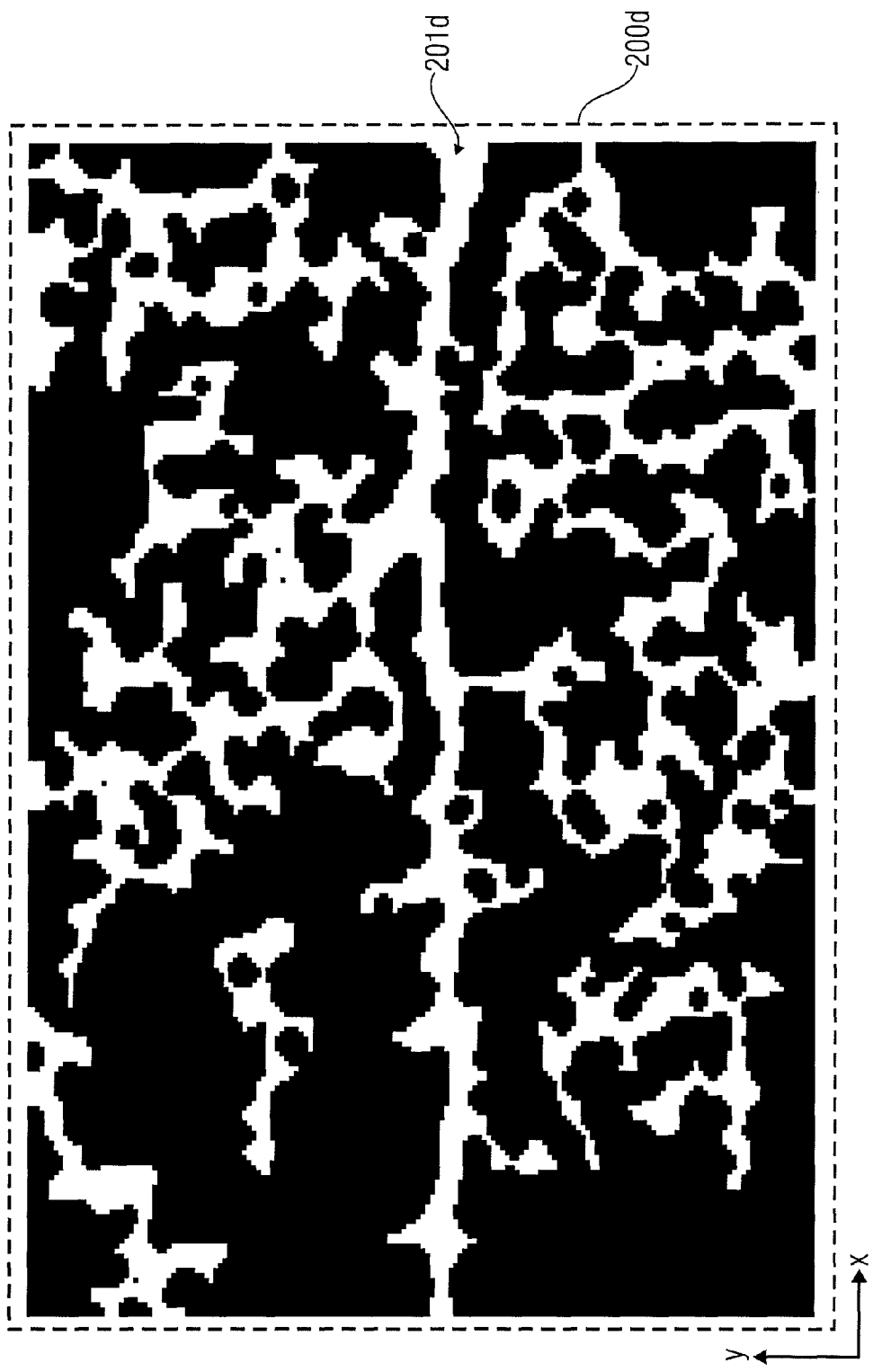

METHOD AND APPARATUS FOR DETECTING OBJECTS

CROSS-REFERENCE TO RELATED APPLICATIONS

This application claims priority from German Patent Application No. 102008056600.4-53 which was filed on Nov. 10, 2008, and is incorporated herein in its entirety by reference.

BACKGROUND OF THE INVENTION

Embodiments of the invention relate to a method for detecting an object on an image representable by picture elements.

Embodiments of the invention relate to technical fields of image processing, segmentation, formative or morphological processing, surface inspection as well as adaptive thresholding.

A search for scratch-type (or crack-type or scrape-type) defects on surfaces is a common task in industrial image processing. Scratch-type objects (scratches, cracks, scrapes, flaws, tears, rifts, splits, etc.) have frequently no solid appearance and disintegrate into a plurality of fragments with a different width and contrast. In order to detect those objects and to calculate their real dimensions, it is frequently necessitated to find and collect their fragments.

This can be performed, for example, with segmentation methods from digital image processing. Segmentation is a subsection of digital image processing and machine vision. Generating regions that are contiguous with regard to content by combining neighboring pixels corresponding to a certain homogeneity criterion is referred to as segmentation.

Many methods for automatic segmentation are known. Basically, they are mainly divided into pixel-, edge- and region-oriented methods. Additionally, a distinction is made between model-based methods, where a certain shape of the objects is used as the starting point, and texture-based methods, where an inner homogenous structure of the object is also taken into consideration. There is no clear dividing line between those methods. Also, different methods can be combined for obtaining better results.

Pixel-oriented methods decide for every individual picture element whether the same belongs to a certain segment or not. This decision can be influenced, for example, by the surroundings. The most widespread method is the thresholding method. Edge-oriented methods search an image for edges or object transitions. Edges are mostly between the pixel regions of an image. Region-oriented methods consider pixel sets as an entity and try to find contiguous objects.

An overview over the existing segmentation methods is described in more detail in "Kenneth R. Castleman: Digital Image Processing, Prentice-Hall, 1996, pp. 447-481" [1].

When segmenting images with elongated objects, in particular on an inhomogenous background, such objects are frequently disintegrated into several fragments. For joining the fragments of the object, for example, known morphological operations are used, such as morphological closing, for example according to [1]. Such a method can consist, for example, of the following steps:
1. Initial binarizing the image with a known method (global thresholding or adaptive thresholding).
2. Closing or morphological closing, respectively, for connecting the individual fragments.
3. Finding and describing all appearances of connected marked pixels.
4. Analysis of found objects and selection of the elongated objects.

On a complex background, this method can be erroneous since, during morphological closing, only the distance between marked pixels is relevant, and if, during initial binarizing, a large amount of appearances are marked due to the irregular background, objects that do not belong together can also be joined upon closing. In the case of a high-contrast background, practically the whole surface can be marked after closing.

A further common problem in industrial image processing is the non-uniform illumination or the non-uniform features on the surface itself.

One problem of many segmentation algorithms is the susceptibility to alternating illumination within the image. This can have the effect that only one part of the image is segmented correctly, while in the others the segmentation is unsuitable. Frequent problems are, for example, over-segmentation, i.e. too many segments, and under-segmentation, i.e. too little segments.

For applications for the surface inspection of spurious noisy images, such as in images with heavily fluctuating brightness or in images of mirroring surfaces, morphological opening or closing methods are mostly slow and provide inaccurate results due to the erroneous detection of the segmentation.

A plurality of further methods of finding elongated objects has been developed for vessel segmentation in retinal images. In "X. Jiang, D. Mojon: "Adaptive Local Thresholding by Verification Based Multithreshold Probing with Application to Vessel Detection in Retinal Images, IEEE Trans. On Pattern Analysis and Machine Intelligence, Vol. 25, No. 1, 2003, pp. 131-137" [2], for example, a method for vessel detection is presented. However, this method, also known as "verification-based multi-threshold probing" includes an application-specific algorithm, which is highly complex and not clearly described.

The above method is very expensive regarding computing complexity, and the time for determining the results is very long. For example, the average computing time for an image of the size of 605×700 pixels is stated with 8 to 36 seconds per image, depending on the selected threshold step size, when the method runs on a Pentium 3 processor with 600 MHz clock rate. Thus, this method is hardly suitable for use in industrial applications having real-time requirements regarding image segmentation.

SUMMARY

According to an embodiment, a method for detecting an object on an image representable by picture elements may have the steps of: determining first and second adaptive thresholds for picture elements of the image, wherein the first and second adaptive thresholds depend on an average intensity in a region around the respective picture element; determining partial objects of picture elements of a first type, wherein the picture elements of the first type are obtained based on a comparison with the first adaptive threshold; determining picture elements of a second type, wherein the picture elements of the second type are obtained based on a comparison with the second adaptive threshold; combining a first and a second one of the partial objects to an extended partial object by picture elements of the second type, wherein the object to be detected can be described by a sum of the partial objects of picture elements of the first type and/or the sum of the obtained extended partial objects.

Another embodiment may have a computer program having a program code for performing the inventive method when the computer program runs on a computer.

According to another embodiment, an apparatus for detecting an object on an image representable by picture elements may have: a means for determining first and second adaptive thresholds for picture elements of the image, wherein the first and second adaptive thresholds depend on an average intensity in a region around the respective picture element; a means for determining partial objects of picture elements of the first type, wherein the picture elements of the first type are obtained based on a comparison with the first adaptive threshold; a means for determining picture elements of the second type, wherein the picture elements of the second type are obtained based on a comparison with the second adaptive threshold; and a means for combining a first and a second one of the partial objects to an extended partial object by picture elements of the second type, when a minimum distance exists between the first and second one of the partial objects, wherein the object to be detected can be described by a sum of the partial objects of picture elements of the first type and/or obtained extended partial objects.

Embodiments of the invention provide an accelerated logical-morphological method for detecting elongated, linear or differently shaped objects on spurious surfaces, wherein the method is based on the principles of human visual perception and comprises adaptive thresholding and logical-morphological operations for merging the fragments of the objects.

By using methods of human visual perception, embodiments of the invention imitate those steps of image segmentation executed by the human brain during the perception of objects, so that high detection accuracy is obtained.

Embodiments of the invention allow a very fast detection, particularly of elongated objects, for example scratches, cracks, scrapes, or rifts on spurious surfaces, and thus obtain a significantly higher velocity than common methods applying morphological closing. However, the detection is not only limited to elongated or linear objects, such as blood vessels or chromosomes, but objects of a different shape can also be detected, such as irregularities or errors on surfaces to be examined.

Thereby, the complexity of the inventive method is so low that the same can be implemented on a commercially available processor for implementing an image segmentation method in real time, for example for detecting elongated or linear objects. An elongated or linear object is defined, for example, by the presence of a main longitudinal axis along which picture elements belonging to the object are centered (in a regular or irregular manner). Thereby, a frequency at which pixels belonging to the object occur is significantly higher in the region of the main longitudinal axis compared to regions outside this axis.

The quality of detection, particularly on noisy surface images, and the robustness of the inventive method are better than conventional methods, for example the morphological closing method described under [1]. The computing velocity of the method according to embodiments of the invention is significantly higher than the computing velocity of common morphological closing methods, for example according to [1] or [2].

Embodiments of the invention can be successfully used in the field of industrial image processing and obtain high detection rates in real-time use at a continuous pass-through rate. The computing times are significantly below the computing times of conventional object detection methods at detection rates close to 100%.

BRIEF DESCRIPTION OF THE DRAWINGS

Embodiments of the present invention will be detailed subsequently referring to the appended drawings, in which:

FIG. 3a-d is a schematical representation, by means of a pixel diagram, regarding a method for detecting an object according to an embodiment of the invention;

FIG. 4d is the image according to FIG. 4a after a last segmentation step of a conventional method for morphological closing with a modified erosion step;

DETAILED DESCRIPTION OF THE INVENTION

Figure 1:
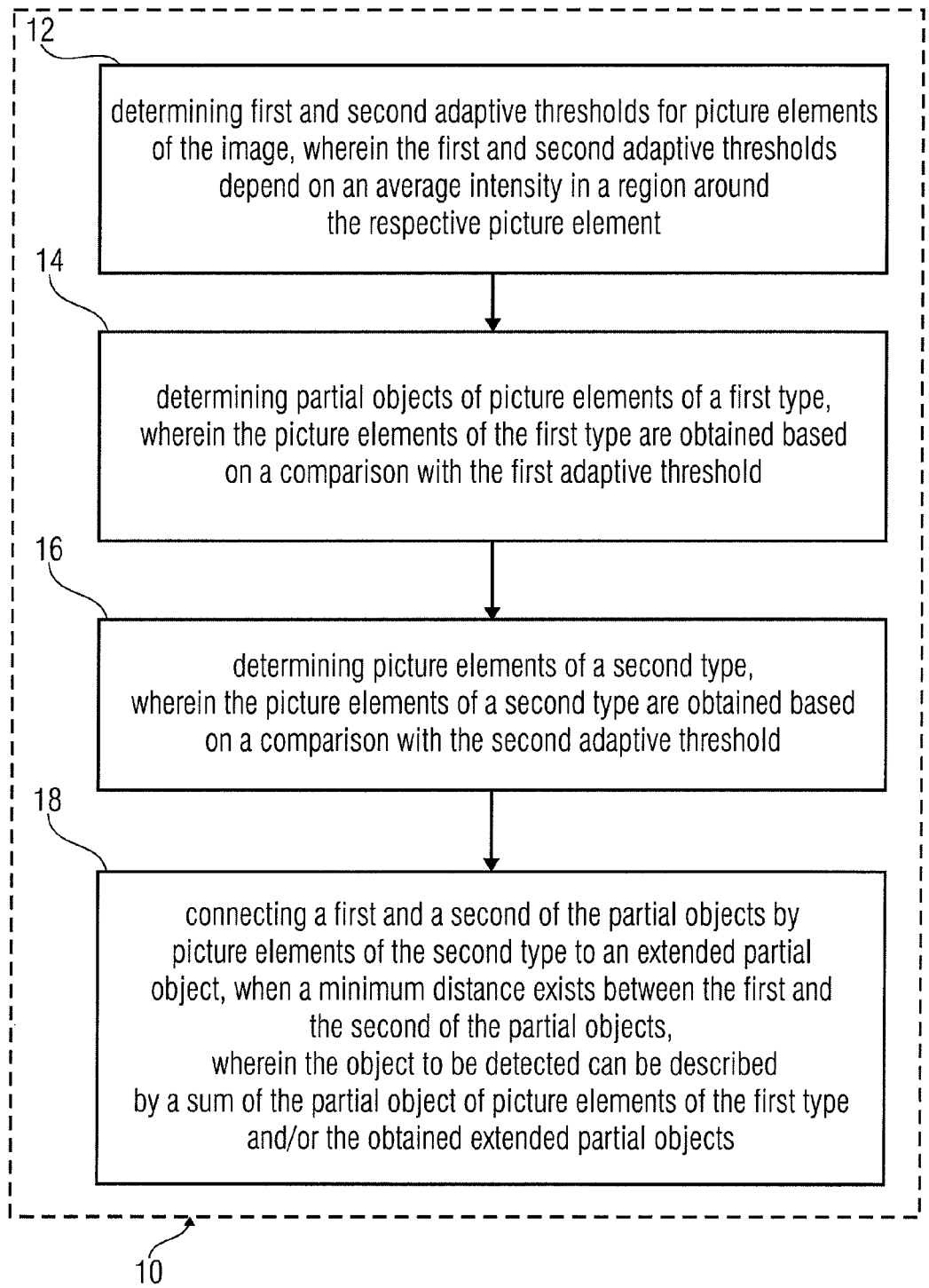
FIG. 1 is a block diagram of a method for detecting an object according to an embodiment of the invention.

FIG. 1 shows a block diagram of a method for detecting an object according to an embodiment of the invention. The method 10 comprises a first step 12 "determining first and second adaptive thresholds for picture elements of the image, wherein the first and second adaptive thresholds depend on an average intensity in a region around the respective picture element". Further, the method 10 comprises a second step 14 "determining partial objects of picture elements of a first type, wherein the pixels of the first type are obtained based on a comparison with the first adaptive threshold". Further, the method 10 comprises a third step 16 "determining picture elements of a second type, wherein the picture elements of the second type are obtained based on a comparison with the second adaptive threshold". Further, the method 10 comprises a fourth step 18 "combining a first and a second one of the partial objects to an extended partial object by picture elements of the second type, when a minimum distance exists between the first and the second of the partial objects, wherein the object to be detected can be described by a sum of the partial objects of picture elements of the first type and/or the obtained extended partial objects".

Thereby, all partial objects are uniformly processed. The object to be detected can comprise, for example, partial objects of the first type. The object to be detected can comprise, for example, extended partial objects (i.e. partial objects of picture elements of the first type that have been extended to extended partial objects by picture elements of the second type). The object to be detected can comprise, for example, partial objects of picture elements of the first type and extended partial objects, i.e. combinations of partial objects and extended partial objects. However, the object to be detected does not consist exclusively of picture elements of the second type.

In the object to be detected, picture elements of the second type used for connecting or combining the partial objects of picture elements of the first type can be removed or masked. For example, a bounding box can be placed around the extended partial objects for illustrating the object to be detected.

Connecting a first and a second of the partial objects by picture elements of the second type is meant in the sense of "with the participation of" picture elements of the second type. This means connecting can also be performed with the participation of picture elements of the first type (or by combinations of picture elements of the first and the second type).

In addition, the method can be followed by further steps not shown in FIG. 1 for deleting regions comprising less than a predeterminable number of picture elements or having a geometrical shape deviating from a predeterminable geometrical shape. The predeterminable geometrical shape can, for example, specify an elongated object, so that tear-type, scratch-type, scrape-type or also vessel-type objects fit into this predeterminable geometrical shape, while differently shaped fragments, for example a mirror image of the illumination source on the image, or objects whose size exceeds a predeterminable threshold do not correspond to the geometrical shape and are thus deleted.

Binary image data processing provides a simple method for assigning two gray scales (e.g. black and white) to binary images. Thereby, a binary image results from an image segmentation operation for mapping the gray scales of the image to the two gray scales of the binary image. If the original segmentation is not satisfactory, there are options of pre- and post-processing the binary image for improving processing. The process of image segmentation can be referred to as a process dividing parts of a digital image into disjoint, i.e. non-overlapping, regions. One region is a contiguous area of pixels or picture elements, i.e. an area where all pixels are adjacent to or touch each other. This means that between two pixels in a connected area, a contiguous path exists completely within the area, wherein a contiguous path is a path that moves between neighboring pixels. Thus, in a contiguous area, a contiguous path between any two pixels of the contiguous area can be followed without ever leaving the area.

The image can, for example, be considered as a matrix of pixels, wherein 0 or 1 can be assigned to a pixel, so that, for example, 0 corresponds to a white color point and 1 to a black color point.

Thus, the image can be represented as a raster of picture elements, wherein every picture element can be represented by its Cartesian coordinates (x,y). Alternatively, other coordinate systems can be used, for example polar coordinates. The picture elements can have different intensities; for example any countable number on a scale from 0 to 255 can be assigned to an intensity.

Adaptive thresholding according to the first step 12 of method 10 is a fast and efficient method for counteracting adverse effects of the non-uniform illumination of the object or non-uniform features of the object surface. Thereby, the threshold for segmentation is calculated by an adaptive thresholding method from the local features of the surrounding image for the point of interest.

The thresholding methods are a group of algorithms for segmenting digital images. With the help of thresholding methods, a decision can be made in simple situations as to which picture elements represent searched-for objects and which belong to their surroundings. Thresholding methods usually result in binary images.

A motivation for using binary images is the availability of fast binary image algorithms, e.g. for blob analysis ("blob"=spot of color). In imaging processing methods, memory space saving plays a minor part. As in most segmentation methods, picture elements, the so-called pixels, are assigned to different groups, the so-called segments, in thresholding methods. Thereby, the image to be segmented is in the form of numerical values, mostly one or several color values or gray scales per pixel. The assignment of a pixel to a segment is determined by the comparison of the gray scale or another one-dimensional feature with a threshold. The gray scale or gray value of a pixel is its brightness value. Since this operation is applied independently for every pixel, the thresholding method is a pixel-oriented segmentation method. The thresholding method can be quickly implemented due to its simplicity and segmentation results can be calculated with little effort.

The thresholding method binarizes an output image, i.e. exactly two segments are formed, in the most frequent case of application for this method, this is the background on the one hand and the searched-for object on the other hand. The assignment to the two segments, i.e., for example, zero or one, is performed based on a comparison of the gray scale of the considered pixel with the previously determined threshold. Thus, the result image can be calculated with very little computing effort, since only a simple comparison operation has to be performed per pixel.

In the thresholding method, one segment can be assigned to every pixel. In contrast to many other segmentation methods, the threshold method does not have to form contiguous segments. It is quite imaginable and frequently also desired that several spatially separate objects in the image having a similar brightness value are combined to one segment. The size of the segmented object can vary heavily depending on the selection of the threshold.

In the adaptive thresholding method, a neighborhood N is considered for every pixel and, based on this neighborhood, a matching threshold t(N) is calculated. Thereby, an automatic method for selecting the threshold can be used. The respective calculation specification for every pixel (x,y) is:

$$T_{adaptive}(x, y) = \begin{cases} 0 & \text{if } g(x, y) < t(N(x, y)) \\ 1 & \text{if } g(x, y) \geq t(N(x, y)) \end{cases}$$

The method is extremely resistant to local brightness changes. Compared to a global thresholding method assigning a global threshold to every picture element, the calculation effort is only slightly higher, since a new threshold is calculated for every picture element.

In the first step 12, for picture elements of the image, i.e. for all or part of the picture elements, first and second adaptive thresholds are determined. These two thresholds depend on an average intensity in a region around the respective picture element. The average intensity $\bar{I}(x, y)$ of a picture element with the Cartesian coordinates x and y can be determined in the region around the picture element (x,y), for example by the following relationship:

$$\bar{I}(x, y) = \frac{1}{N_{MN}} \sum_{m=-M}^{m=M} \sum_{n=-N}^{n=N} I(x-m, y-m),$$

wherein the region here is determined by the two summation limits M and N, and a weighting factor $N_{MN}$ causes additional weighting of the region, e.g. normalization by the area of the region.

The two adaptive thresholds can additionally depend on a contrast factor C, for example by the relationship:

$$T(x,y) = C\bar{I}(x,y).$$

If a contrast factor $C_1$ is selected for the first adaptive threshold that is higher than a contrast factor $C_2$ for the second adaptive threshold, then the first adaptive threshold $T_1(x,y)$ can be determined by the relationship $$T_1(x,y) = C_1\bar{I}(x,y)$$

and the second adaptive threshold $T_2(x,y)$ by the relationship $$T_2(x,y) = C_2\bar{I}(x,y).$$

By selecting an adaptive threshold, an individual threshold is determined for every picture element of the image, which depends on the average intensity $\bar{I}(x, y)$ around the picture element (x,y) and a contrast factor. If the intensity of the picture element (x,y) exceeds the threshold individually calculated for this picture element, a pixel is assigned to this picture element, for example on an output image. If the intensity of this picture element (x,y) falls below the adaptive threshold determined for this picture element, no pixel is represented, for example on the output image.

With two adaptive thresholds, for example, two output images are obtained, wherein a first output image represents all pixels assigned to picture elements of the original image where the intensity exceeds the first adaptive threshold, while on a second output image all pixels are represented that are assigned to picture elements of the original image where the intensity exceeds the second adaptive threshold.

Instead of exceeding the adaptive threshold, falling below the adaptive threshold can also be represented. This would result in an inverted output image compared to the previously mentioned output image.

In the second step 14 of the method 10, partial objects of picture elements of a first type are determined, wherein the picture elements of the first type are obtained based on a comparison with the first adaptive threshold. For example, all picture elements whose intensity exceeds the first adaptive threshold can be assigned to the picture elements of the first type.

In the third step 16, a comparison of the intensity of the picture elements with the second adaptive threshold is performed, and picture elements whose intensity exceeds the second adaptive threshold are assigned to picture elements of a second type. Thereby, it can occur that picture elements whose intensity exceeds the first adaptive threshold, when this first adaptive threshold is higher than the second adaptive threshold, are also assigned to the picture elements of the second type. In this case, it is advantageous to assign the picture elements whose intensity exceeds the higher or higher-contrast adaptive threshold to the picture elements of the first type and to assign the picture elements whose intensity lies between the second adaptive threshold and the first adaptive threshold to the picture elements of the second type.

Other picture elements whose intensity exceeds neither the first nor the second adaptive threshold are not assigned to the picture elements of the first type and not to the picture elements of the second type.

Generally, the method is not limited to a number of two adaptive thresholds. It can also be applied to a plurality of adaptive thresholds. For example, adaptive thresholds can be determined according to the following relationship:

$$T_i(x,y) = C_i\bar{I}(x,y),$$

wherein adaptive thresholds $T_i(x,y)$ can be determined by different contrast factors $C_i$ from the average intensity $\bar{I}(x, y)$ around the respective picture element (x,y). The second step 14 can determine, for example, partial objects of picture elements of an $i^{th}$ type, wherein the picture elements of the $i^{th}$ type are obtained based on a comparison with the $i^{th}$ adaptive threshold. The picture elements of a $j^{th}$ type can be obtained based on a comparison with the $j^{th}$ adaptive threshold. Thereby, j can differ from i, and can, for example, be higher than i.

For example, two partial objects of a first type can first be connected to picture elements of a second type, then successively to picture elements of a third type, a fourth type, etc., when a high-contrast description is performed with picture elements of the first type, and lower-contrast descriptions in a descending order with picture elements of the second, third, fourth, etc., type. This can be performed successively in a single dilation step. Alternatively, in every further dilation step, the partial objects can be connected to picture elements of a lower type. In both cases, a barrier can state to what type of picture elements the dilation is to be applied.

Within the invention, regarding connectivity or neighborhood, two rules describing the same can be stated. If only laterally contiguous pixels, i.e. top, bottom, right and left are regarded as contiguous, this is a four-connectivity or a four-neighborhood, and the objects are connected fourfold. This means that every pixel has (at least) four neighbors to which the same can be connected. If, additionally, diagonally neighboring or 45° neighboring pixels are considered as contiguous, this is called eight-connectivity or eight-neighborhood and the objects are referred to as connected eightfold. There, every pixel has eight neighbors to which the same can be connected. For the methods for image processing, mostly one of the two connectivity rules is used and maintained consistently. Frequently, eight-connectivity is closer to the results of human sensory perception.

In binary image processing, the four-connectivity only considers vertically or horizontally opposing pixels as neighboring, while the eight-connectivity considers the eight closest pixels of a pixel as neighbors. For many applications it is more advantageous to consider the eight-connectivity.

Further, in the second step 14, partial objects are determined from the picture elements of the first type. This can be performed, for example, by a blob-finding process (blobfinder), wherein the picture elements of the first type are searched by a four-neighborhood or four-connectivity rule for finding contiguous areas. A four-neighborhood or four-connectivity exists when a picture element of the first type borders horizontally or vertically on a second picture element of the first type.

The contiguous areas determined in this manner, also referred to as blobs, then form the partial objects. Further, prior to further processing, all picture elements of the first type forming no partial objects, since the same have no neighbors, or forming partial objects falling below a predetermined size, can be disregarded. This can be determined, for example, by the examination according to the four-neighborhood or four-connectivity rule. Thereby, it is possible to limit the further processing to areas of interest, which have a certain size and are thus not the result of spurious effects.

After performing the first three steps 12, 14, 16, in an output image, partial objects of picture elements of the first type have been generated, whose intensity exceeds the first adaptive threshold, which are thus, for example, picture elements of high image intensity. Distributed around these partial objects and across the whole image are picture elements of the second type, whose intensity exceeds the second adaptive threshold, but at the same time is not so high that the same can be assigned to the picture elements of the first type. Further, distributed across the image, picture elements can occur that are neither assigned to the first type nor to the second type, i.e. their intensity is below the second adaptive threshold and thus the same have a lower intensity.

Within the invention, morphological or formative image processing methods can be applied to the image processing of binary images.

By classifying the picture elements in picture elements of the first type, picture elements of the second type and picture elements of no type, efficient object detection becomes possible. The idea here is to combine the partial objects of the picture elements of the first type with other partial objects of picture elements of the first type in such a way that only picture elements of the second type are used for this process. The high-contrast partial objects can thus be merged by image regions of the image having a lower contrast. Here, it is assumed that a contiguous partial object is characterized by the fact that the contiguous areas have a certain minimum contrast, while separate partial objects can be close to each other but have a significantly lower intensity in the boundary region compared to an area in which the partial objects are contiguous.

This principle is illustrated by the fourth step 18 of the method 10, where a first and a second one of the partial objects are combined to an extended partial object by picture elements of the second type, when a minimum distance exists between the first and the second of the partial objects, wherein the object to be detected can be described by a sum of the partial objects of the picture elements of the first type and/or the obtained extended partial objects. This means the partial objects determined in the second step 14 are combined by the picture elements of the second type determined in the third step 16, when a minimum distance exists between the two partial objects. The minimum distance can designate a step size of a morphological dilation process.

For example, the fourth step 18 of the method 10 can be realized by connecting a partial object to an extended partial object by incorporating the neighboring pixels of the partial object corresponding to picture elements of the second type into the partial object. Thus, the partial object grows by the neighboring picture elements of the second type.

Here, it is possible to determine neighboring picture elements by an eight-neighborhood (or eight-connectivity) rule or a four-neighborhood (or four-connectivity) rule. This means that for every edge point of the partial object it is checked, by a four- or eight-neighborhood rule, whether a neighboring picture element of the second type exists, by which the partial object can be extended. This process can be performed for several or all partial objects of the image, wherein every partial object that has been extended by the neighboring picture elements of the second type can be extended again by the picture elements of the second type neighboring the extended partial object.

Such an iterative process (or a successive extension, respectively) causes growth of the partial objects and can be performed, for example, until the minimum distance or a predetermined iteration step size is reached. As a termination criterion, a maximum number of connected partial objects or a predetermined range of the extension (for example regarding the number of pixels or a unit of length) can be stated. If this process has the effect that two partial objects border on each other by the extended picture elements of the second type or even overlap, the two partial objects will be combined to an extended partial object by the picture elements of the second type. The dilation process can be further applied to this extended partial object if, for example, an iteration step size has not been reached.

The extended partial object can incorporate all picture elements of the second type that have been used in the dilation process, or can be limited to part of these picture elements of the second type, for example by incorporating only those picture elements of the second type establishing a contiguous path between the original partial objects. The higher the minimum distance or the iteration step size, respectively, has been selected, the higher the degree of connectivity, i.e. the number of connections between partial objects of picture elements of the first type. However, a minimum distance selected too high can also have the effect that partial objects of picture elements of the first type located far apart from each other are connected, thus causing undesired artefacts.

The object to be detected is described by the sum of obtained extended partial objects and/or partial objects of picture elements of the first type. The sum is to be considered in the sense of a combination of partial objects or extended partial objects, respectively. The sum of the partial objects of picture elements of the first type and/or the obtained extended partial objects can be combined for obtaining a representation of the object to be detected.

Here, it can happen that already in the second step 14 of method 10, those partial objects of picture elements of the first type describing the object to be detected are determined without necessitating the connection of these partial objects to picture elements of the second type. This case can occur, for example, at very good illumination of the object. Alternatively, the case can occur that the object to be detected consists of partial objects of picture elements of the first type and of extended partial objects only resulting from the connection of partial objects. For example, the image can have well-illuminated areas and other poorly illuminated areas. In the first areas, for example, no partial objects need to be combined, for example, while in the poorer illuminated areas a detectable object only occurs when partial objects are combined to extended partial objects.

Thereby, all obtained extended partial objects and/or partial objects can be part of the sum, or only those obtained extended partial object and/or partial objects meeting a certain relationship. This can, for example, be a specific geometrical shape. If the object has an elongated or linear shape, only extended partial objects and/or partial objects, for example, also having an elongated or linear shape can be considered for the summation to thus exclude artefacts from the start.

For example, a predetermined geometrical shape can have a main longitudinal axis such that the extended partial objects and/or the partial objects are checked to see if they also have the main longitudinal axis that can run, for example, at a certain angle or within a certain angle range. If it is known, for example, that the object to be detected is a scratch having a certain direction, for example horizontal to the image axis, then, for example, only such extended partial objects and/or partial objects having a geometrical shape whose main longitudinal axis also runs approximately horizontally to the image axis can be included in the summation.

Also, a relative distance relationship between the extended partial objects and/or the partial objects can be utilized, for example in that only those extended partial objects and/or partial objects are included in the summation where a mutual distance between individual extended partial objects and/or partial objects lies within a predetermined distance range. In that way it can be excluded that an elongated object is formed of extended partial objects and/or partial objects that are so far away from a plurality of the extended partial objects and/or partial objects that a logical connection can be excluded.

Thus, combining the partial objects of picture elements of the first type and/or obtained extended partial objects can be performed with regard to orientation, geometry (i.e. for example elongated objects), mutual distance and/or size (i.e. number of picture elements) of the partial objects and/or the extended partial objects.

The object to be detected can, for example, be an elongated or linear object, e.g. a scratch, a tear, or a rift, in industrial image processing, for example of metal parts. However, it is also possible to detect blood vessels, for example on the retina or in the coronary area, or also chromosomes in medical fields of application. However, the method 10 is not limited to the detection of elongated objects, the same can also be used for detecting objects of different shapes, for example for detecting dents or also for pattern recognition, for example visual field detection or detection of fingerprints or objects of different shapes.

The image can have a complex background, for example caused by high interferences, reflections or weak illumination. Exemplary applications are detection of tears and scratches on workpieces in real-time conditions in industrial image processing and detection of elongated structures, for example blood vessels, bone fractures etc. in medical image processing.

Figure 2:
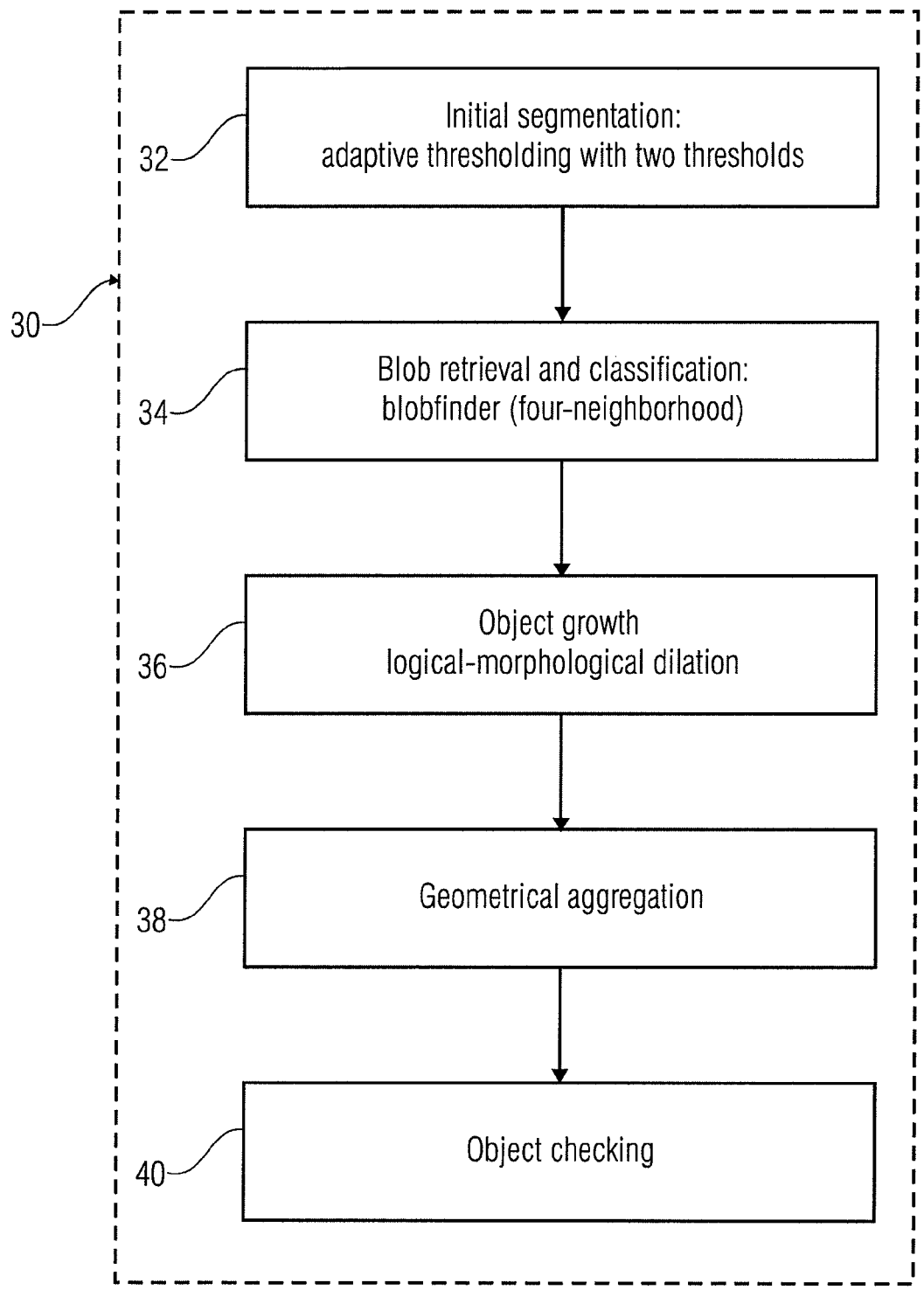
FIG. 2 is a block diagram of a method for detecting an object according to a further embodiment of the invention.

FIG. 2 shows a block diagram of a method for detecting objects according to a further embodiment of the invention. The method 30 comprises a first step 32 "initial segmentation: adaptive thresholding with two thresholds", a second step 34 (blob retrieval and classification: blobfinder (four-neighborhood)", a third step 36 "object growth: logical-morphological dilation, a fourth step 38 "geometrical aggregation" and a fifth step 40 "object checking".

The first step 32, the initial segmentation, corresponds to the binarization of the image with an adaptive threshold, which can be calculated as follows for every picture element, or pixel, of the image:

$$T(x,y)=C\bar{I}(x,y),$$

wherein T(x,y) designates the adaptive threshold, C a predetermined contrast factor and $\bar{I}(x, y)$ the averaged image brightness in the surroundings or in a region around the respective picture element (x,y), respectively. The averaged image brightness in the surroundings is determined by:

$$\bar{I}(x, y) = \frac{1}{N_{MN}} \sum_{m=-M}^{m=M} \sum_{n=-N}^{n=N} I(x-m, y-m),$$

wherein $N_{MN}$ designates the area of the region around the respective picture element or the area of the averaging filter, respectively.

In the second step 34 of the method 30, blob retrieval and classification of connected marked picture elements, or pixels, is performed by a specific function called blobfinder, which determines the boundary of every blob and its parameters.

The third step 36 of the method 30 performs a logical-morphological dilation method for obtaining object growth. In logical-morphological dilation ("LMD"), fragments of an object appearing as contiguous to the human eye are aggregated. If the object is divided into individual fragments by means of a certain (strong) threshold, the same can be segmented as a connected or contiguous object by means of another (weak) threshold. When this weak threshold is applied to the whole area of the image, however, many other objects are obtained, i.e. artefacts or errors. Thus, in the third step 36 of the method 30, fragments of objects, elongated or not, are found and classified by using a strong threshold, wherein elongated objects are only dilated using information given about the weak threshold. This means in the third step 36, temporary dilation of the initially elongated objects is performed with pixels or picture elements of the weak threshold according to an eight-neighborhood rule.

If the periphery of this dilated object reaches another "heavily" marked object, this object is added to the initial object. In the obtained image of the object, the weak marking itself is not shown. In this manner it is possible to connect fragments separated by a large distance that cannot be connected by common morphological closing methods. On the other hand, no neighboring fragments will be connected if no "natural" connection exists between the same.

In a fourth step 38 of the method 30, an additional geometrical aggregation of detected fragments is performed prior to the size check. By means of geometrical aggregation, individual fragments localized as mutual extensions are collected and aggregated. For example, geometrical aggregation can evaluate information relating to the direction of flaws or tears or to a size of the gap between marked pixels of both fragments. This corresponds to the human perception of a flaw or a tear as a complete object.

Geometrical aggregation of detected fragments can thus be performed with regard to orientation, geometry (i.e. for example elongated fragments), mutual distance and/or size (i.e. number of picture elements) of the fragments.

In the fifth step 40 of the method 30, object checking is performed. Object checking is a simple method verifying whether the size of the object exceeds a predetermined limit. For example, such a limit can correspond to a size of 140 pixels, for defining significant flaws or cracks. In object checking 40, small objects up to a size of N pixels are ignored, wherein N can depend on the image and the task. The size of the object to be detected can be checked by comparing a number of picture elements, which the object to be detected comprises, with a predetermined number.

Apart from processing only the extended objects in the third step 36 of the method 30, this has the additional effect of accelerating the whole method 30. In logical-morphological dilation according to the third step 36, the blobs are analyzed first prior to dilation, so that the objects can be sorted and their number can be significantly reduced before the same are further processed.

Figures 3A, 3B:
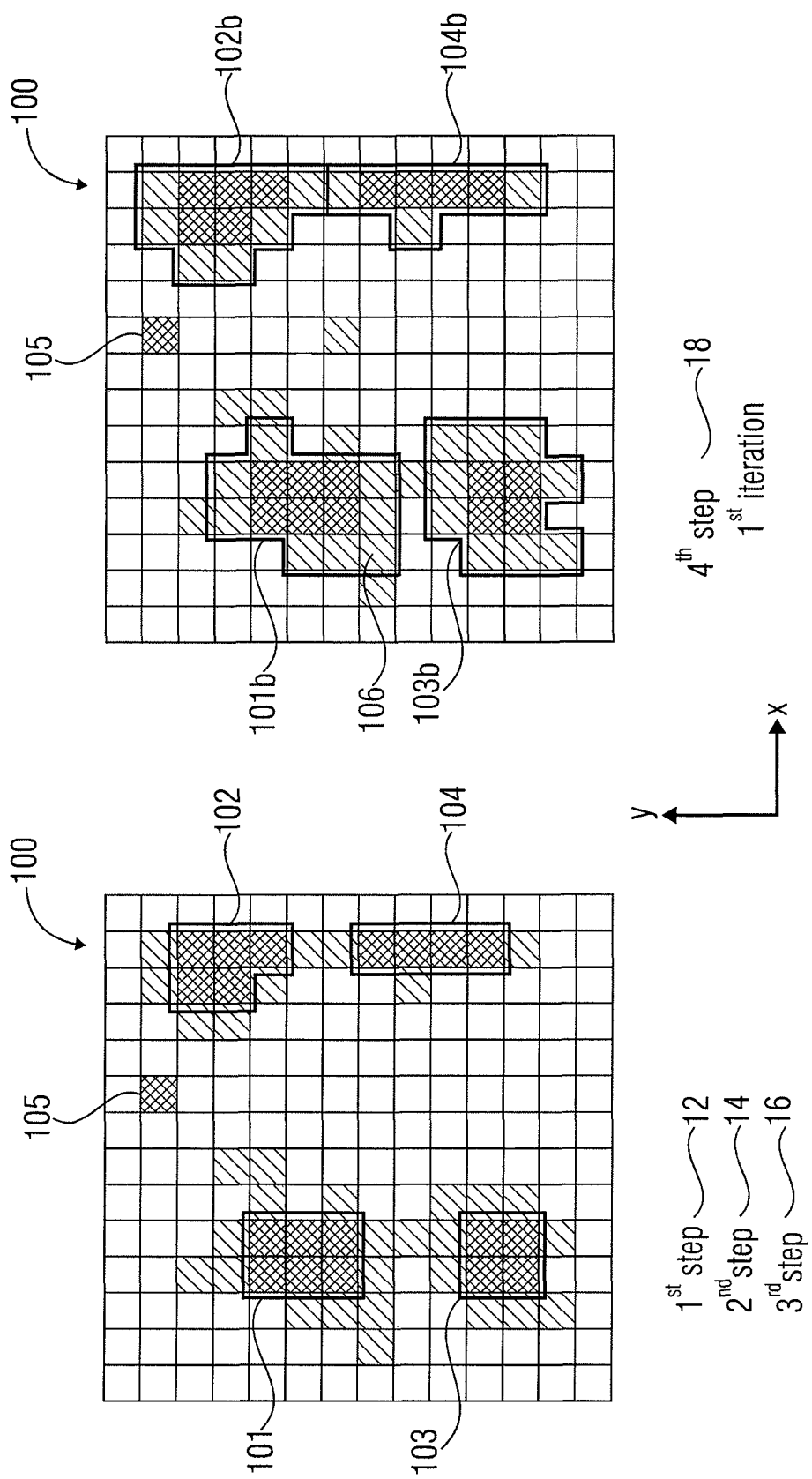

FIGS. 3a-3d show pixel diagrams of a method for detecting an object according to an embodiment of the invention. FIG. 3a illustrates the first three steps 12, 14, 16 of the method 10. FIG. 3b illustrates a first iteration and FIG. 3c a second iteration within the fourth step 18 of method 10. FIG. 3d illustrates the result of method 10.

FIG. 3a illustrates an image 100 as a raster of 14×14 pixels having picture elements of different intensity. In a first step 12 of method 10, first and second adaptive thresholds are determined for picture elements of the image, depending on an average intensity in a region around the respective picture element. In the image 100, picture elements of high intensity are illustrated by double hatching, and picture elements of average intensity by simple hatching, while picture elements of low intensity are illustrated without hatching.

Based on a comparison with the first adaptive threshold, the picture elements of the first type are determined in the second step 14 of the method 10. These picture elements of the first type are still illustrated by double hatching.

In a comparison with the second adaptive threshold, the picture elements of the second type are determined in the third step 16 of the method 10, which are still illustrated by simple hatching in the image 100.

In the second step 14 of the method 10, partial objects of the picture elements of the first type are still determined, wherein in the image 100 the four partial objects 101, 102, 103 and 104 have been determined. This can, for example, be determined by evaluating the four-neighborhood relationship to the picture elements of the first type. With the help of this relationship, six picture elements of the first type (illustrated in a double-hatched manner) forming a first partial object 101, further five picture elements of the first type forming a second partial object 102, further four picture elements of the first type forming a further partial object 103 and further four picture elements of the first type forming a further partial object 104 can be found.

A single picture element of the first type 105 has no neighborhood relationship to further picture elements of the first type, so that the same is disregarded for further processing. The individual partial objects 101, 102, 103, 104 are checked for a certain minimum size. This is, for example, a number of four picture elements of the first type, comprising all four partial objects, so that all four partial objects are considered for further processing.

In a fourth step 18, the first and second partial objects are combined to an extended partial object by picture elements of the second type when a minimum distance exists between the first and the second one of the partial objects. This can be illustrated by a growth process taking place iteratively in this embodiment.

A first iteration of the growth process is shown in FIG. 3b. Thereby, the determined partial objects 101, 102, 103, 104 are extended by neighboring picture elements of the second type, so that the partial objects 101, 102, 103, 104 are increase and increased partial objects 101b, 102b, 103b and 104b result. The enlargement of the partial objects is performed by evaluating an eight-neighborhood rule, wherein edge picture elements of the partial objects 101, 102, 103, 104 are checked regarding their neighborhood to picture elements of the second type, and found neighboring picture elements of the second type are included in the partial objects for forming the enlarged partial objects 101b, 102b, 103b, 104b.

For example, the picture element 106 is added to the first partial object 101 due to the eight-neighborhood rule, while the same would not be added when applying a four-neighborhood rule, since the same has a diagonal neighborhood to one of the picture elements of the first partial object 101. Obviously, it is also possible to use a four-neighborhood rule for the growth process.

FIG. 3c represents a second iteration step for the fourth step 18 of method 10 for detecting an object. The extended partial objects 101b, 102b, 103b and 104b grow again by neighboring picture elements of the second type, so that again extended partial objects 101c, 102c, 103c and 104c result. Even in this second growth process, only such neighboring picture elements consisting of picture elements of the second type are incorporated in the neighborhood rule. Picture elements neither assigned to the first type nor the second type, i.e. picture elements having a low intensity and illustrated by missing hatching are not incorporated in the growth.

In the illustrated image 100, the growth process would stop by itself, since no further neighboring picture elements of the second type can be incorporated into the partial objects in a further growth process.

FIG. 3d shows the result of the fourth step 18 of method 10. The original partial objects 101 and 103 have been combined to an extended partial object 110 and the original partial objects 102 and 104 to an extended partial object 111. The object to be detected is described by the sum of the two extended partial objects 110 and 111. For example, it is still possible here to consider the geometrical shape of the extended partial objects 110, 111 and, for example, to disregard such extended partial objects whose geometrical shape deviates too much from a predetermined shape. Since both of the extended partial objects 110, 111 have a longitudinal axis pointing in the same direction, for example both extended partial objects can be identified as two elongated objects, for example scratches.

Figure 4A:
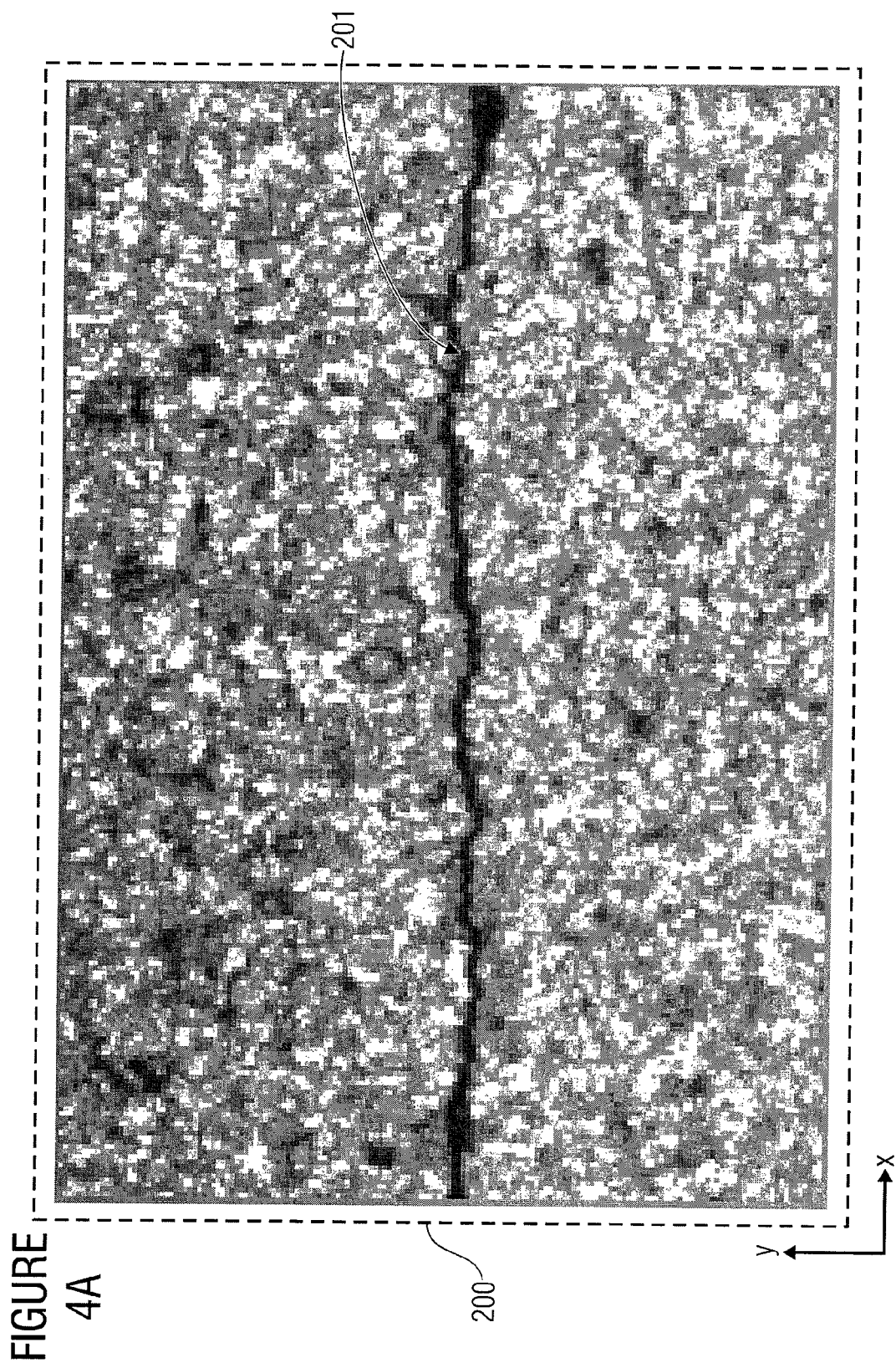
FIG. 4a is an image of a scratch-type object in the original.

FIG. 4a shows an image of a scratch-type object in the original, for example after being captured by a camera. The image 200 has a plurality of picture elements arranged in a square grid and having different gray scale intensities. A scratch 201 can be detected on the original 200, which runs approximately horizontally through the image, approximately in the center of the image. "Horizontal" or a horizontal orientation means orientations running parallel to the x axis (stated in the figures). "Vertical" or a vertical orientation, on the other hand, means orientations running in parallel to the y axis (indicated in the figures). Detecting this scratch 201 is the object of the method 10.

In the first step 12 of the method 10, first and second adaptive thresholds are assigned to the picture elements of the image 200, depending on an average intensity in a region around the respective picture element.

Figure 4B:
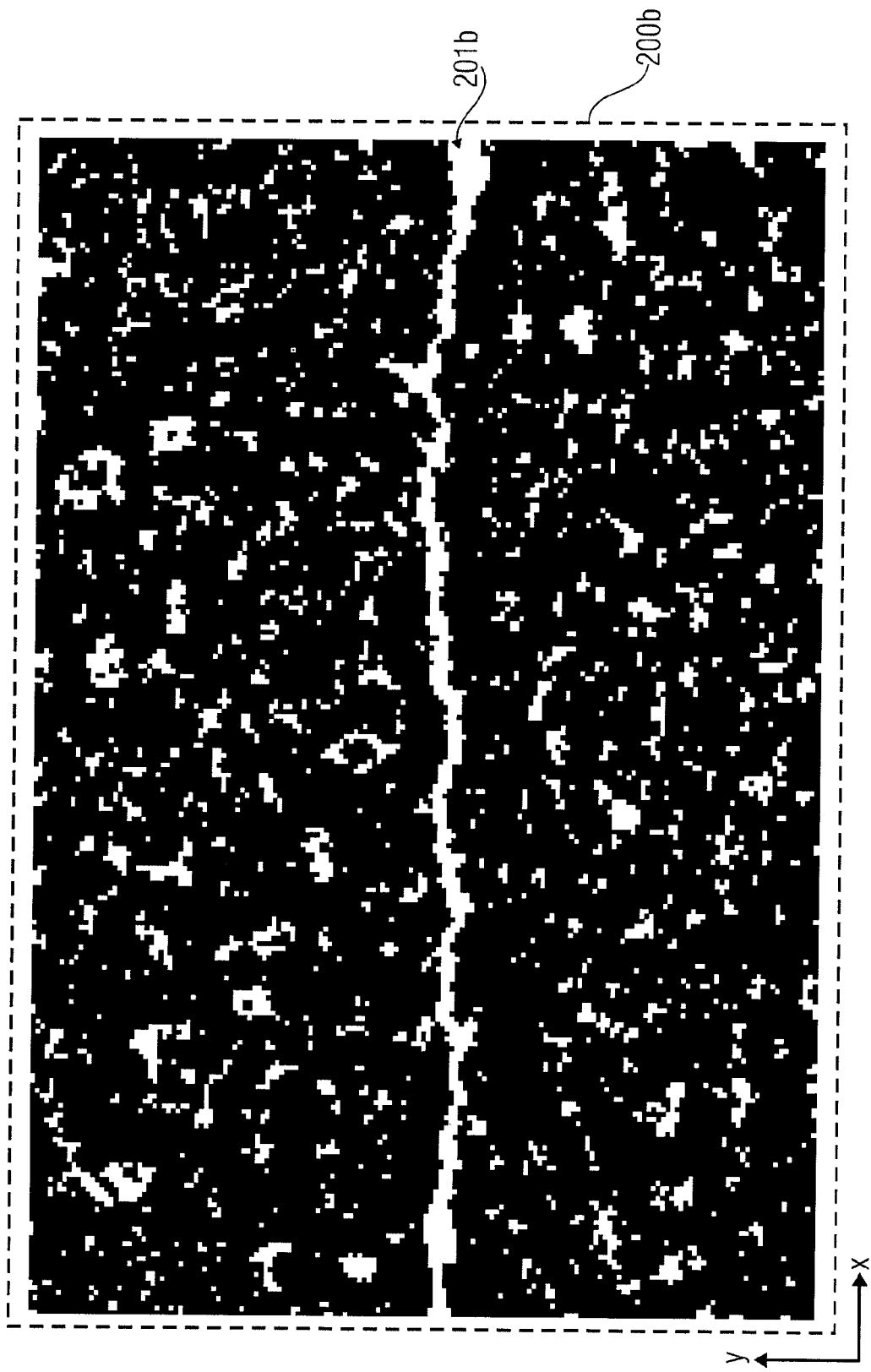
FIG. 4b is the image according to FIG. 4a after an initial segmentation step.

FIG. 4b shows the image 200 of FIG. 4a after a second step 14 of the method 10. Picture elements whose intensity exceeds the first adaptive threshold are illustrated (here in white). An image 200b results, which represents very high-contrast picture elements in white and low-contrast picture elements in black. Here, the original crack 200 is indicated in white and is just perceptible as a crack 201b. Comparing the picture elements to the second adaptive threshold corresponding to a third step 16 of the method 10 results in a similar image as the one illustrated in FIG. 4b, which is, however, not illustrated here.

Figure 4C:
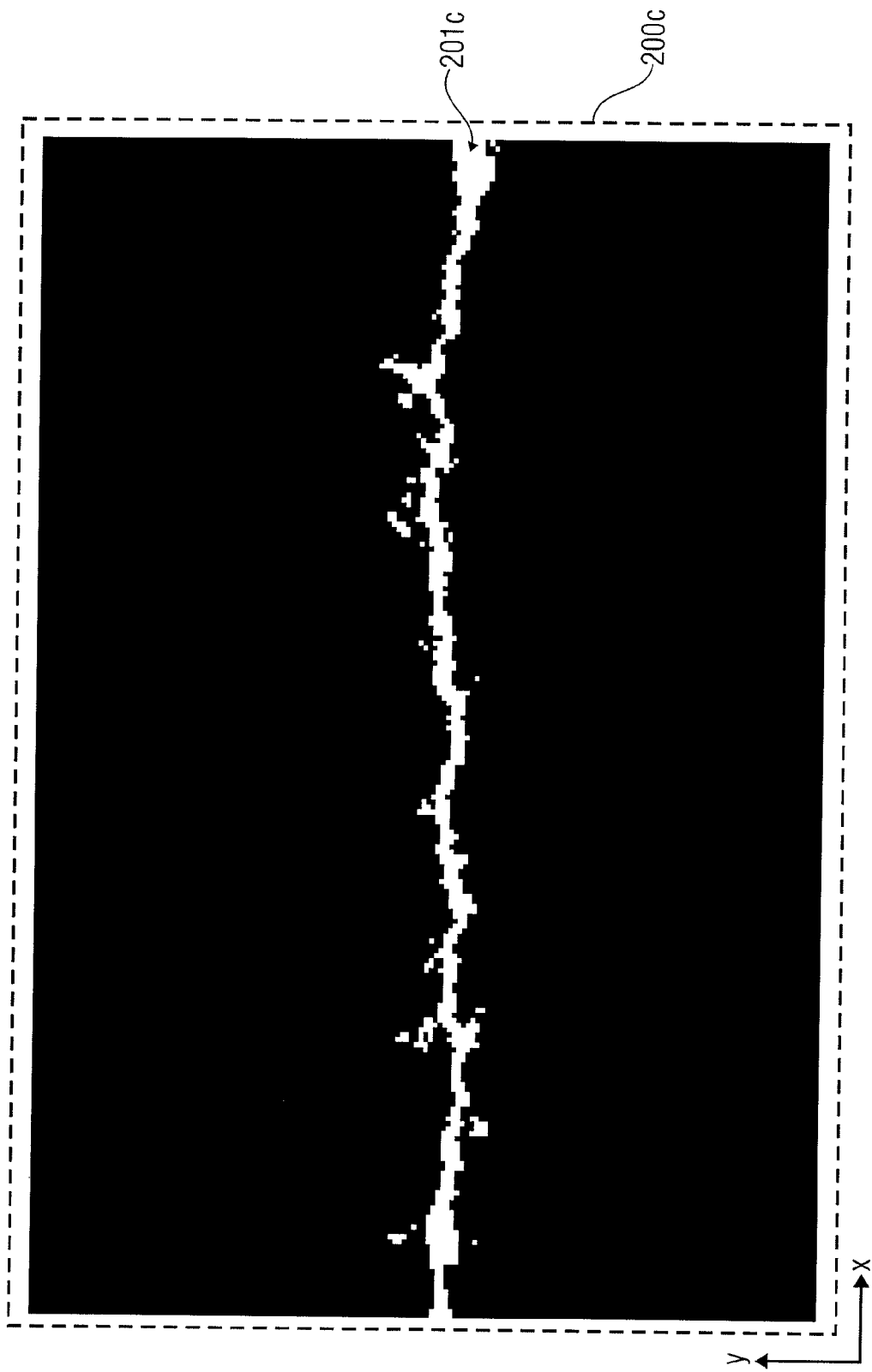
FIG. 4c is the image according to FIG. 4a after a last segmentation step of a method according to an embodiment of the invention.

FIG. 4c shows the image 200 of FIG. 4a after a complete pass-through of the method 10. Here, all objects found below a size of 40 pixels are deleted. Hence, small objects of the background are no longer visible, since all small objects including their markings are deleted during object checking. Thus, only fragments belonging to the crack remain that are combined by the method 10 using low-contrast marking (picture elements of the second type). Low-contrast marking is not included in the image. The resulting image 200c represents the crack 201 according to FIG. 4a as a white linear object 201c. Thereby, the original crack 201 is very clearly visible, since only picture elements 201c belonging to the crack 201 are illustrated on a black background. Only fragments connected to the crack by low-contrast marking are also illustrated in white. All fragments not belonging to the geometrical shape of the crack-type object 201 are not illustrated in the image 200c. In particular with a background having very different intensities and where it is difficult, even for the human eye, to discern the crack-type object from the background, the method 10 for detecting an object provides a very good detection rate allowing a differentiation of the crack 201 from its background.

Figure 4E:
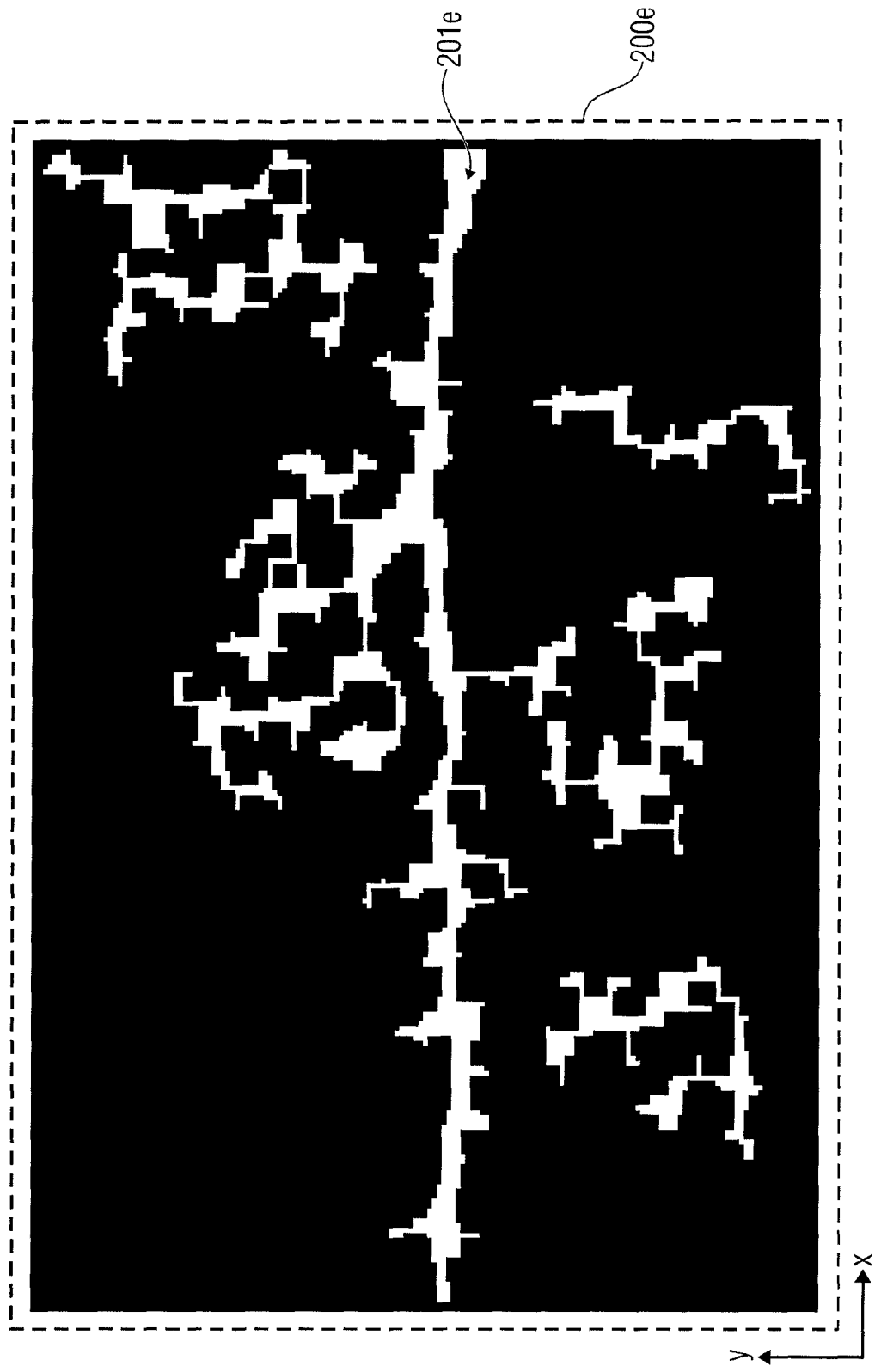
FIG. 4e is the image according to FIG. 4a after a last segmentation step of a conventional method for morphological closing according to a program library.

For illustrating the detection quality of the method 10 compared to conventional methods for detecting objects, FIGS. 4d and 4e represent images of the crack-type object 200d, 200e which have been obtained from the same image 200 according to FIG. 4a and FIG. 4b, but by using two different conventional methods for detecting objects. Here, all objects found below a size of 40 pixels are also deleted. This means that all small objects are deleted here. Only fragments or objects large enough to be detected as fragments connected to the crack remain. The image 200d represents the output image resulting from a last segmentation step of a conventional method for morphological closing using modified erosion. In modified erosion, not all neighboring pixels are removed in one erosion step, but only those neighboring pixels having more than one contact with non-extended pixels.

The output image 200e has been obtained by a conventional method for morphological closing, wherein the morphological operations have been taken from a standard program library. For both output images 200d, 200e, numerous fragments can be detected apart from the detected crack-type object 201d or 201e. The same are distributed across the whole image and no longer allow the viewer to perceive a crack-type object 201 according to the original image 200 of FIG. 4a, but the fragments have the effect that the viewer perceives some sort of leaf structure or tree structure having numerous branches. It looks as if the whole output image 200d or 200e is covered with cracks. In the method with modified erosion, whose output image is illustrated in FIG. 4d, even more fragments become visible than in the conventional method, whose output image 200e is illustrated in FIG. 4e. Both images 200d, 200e clarify the superiority of the inventive method for detecting an object as compared to the conventional methods.

The conventional methods for morphological dilation do not consider any features of the surrounding pixels. The only feature that is considered is the geometrical contact to the marked pixel. This can cause errors on spurious surfaces having a lot of objects and short distances between them. Physically different objects can be connected. A large number of steps for morphological closing can even have the effect that the whole surface is connected. This effect is illustrated in FIGS. 4d and 4e.

For initial segmentation, a contrast factor of $C_1=0.8$ was used, wherein the size of the averaging filter was 11×11 pixels. This means, for averaging the intensity, a region of the size 11×11 pixels or $M=N=5$ was selected. The first adaptive threshold $T_1(x,y)$ has been determined in dependence on the average intensity across this region of 11×11 pixels and a contrast factor of $C_1=0.8$.

For determining the two images 200d, 200e, no further adaptive threshold was used. For determining the image 200c with the inventive method 10, however, a further adaptive threshold $T_2(x,y)$ was determined by a multiplication of the average intensity, averaged across the region of the size 11×11 pixels, with a second contrast factor $C_2=0.9$. Thereby, the first contrast factor $C_1=0.8$ specifies a strong contrast, while the second contrast factor $C_2=0.9$ specifies a weak contrast. Since the object to be detected is illustrated using white pixels, in this case the strong contrast factor $C_1$ is smaller than the weak contrast factor $C_2$. In a representation using black pixels, the ratio would be reversed.

Not all cracks and flaws are as wide and obvious as shown in FIG. 4a. In many cases, the object is divided into numerous separate segments, as illustrated, for example, in FIG. 5a.

Figure 5A:
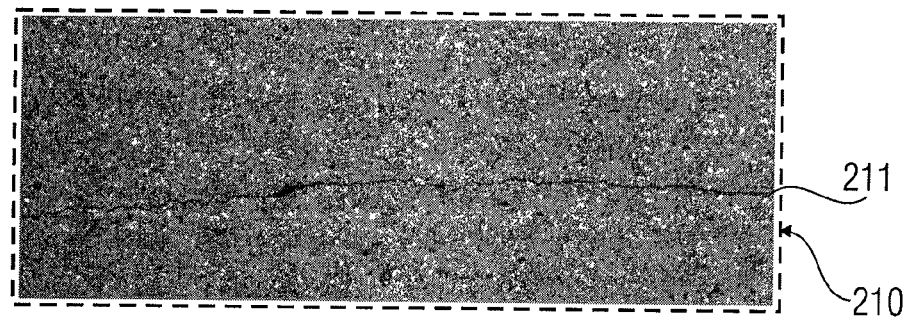
FIG. 5a is an image of a hairline crack-shaped object in the original.

FIG. 5a represents the representation of a fine hairline crack 211 running approximately horizontally through the image 210 that can only hardly be differentiated from the background. With the hairline crack 211, fragments will be obtained independent of the method of image processing.

Figure 5B:
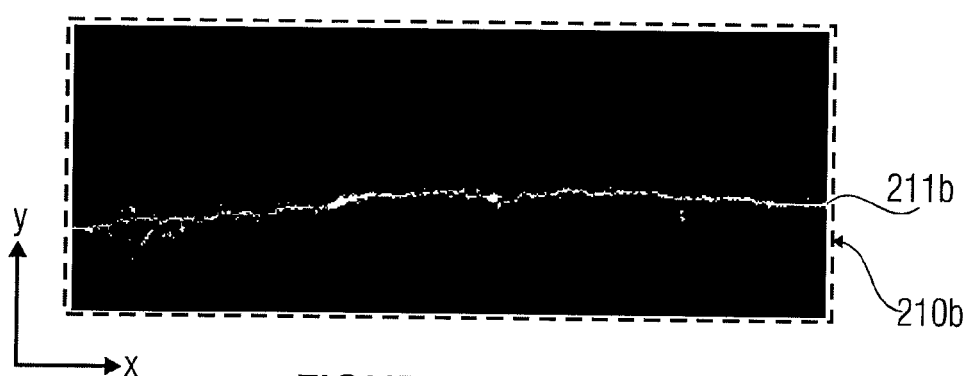
FIG. 5b is the image according to FIG. 5a after a last segmentation step of a method according to an embodiment of the invention.

FIG. 5b represents the output image 210b after running through an inventive method 10, wherein a representation of the hairline crack 211b is very similar to the original shape of the hairline crack 211. The same can be perceived as a white line 211b on a black background, running approximately horizontally across the image 210b.

Figure 5C:
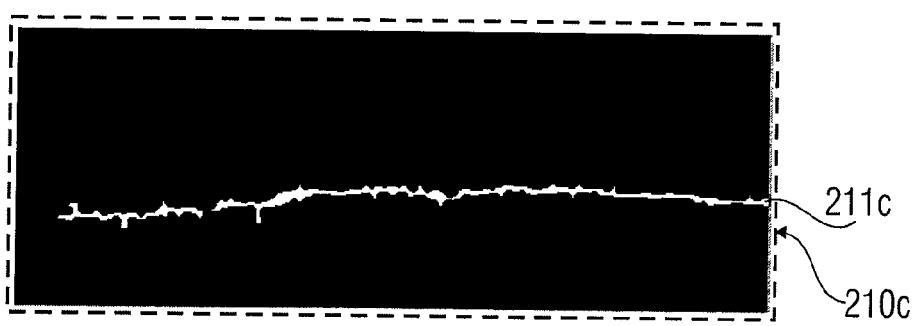
FIG. 5c is the image according to FIG. 5a after a last segmentation step of a conventional method for morphological closing with a modified erosion step.

FIG. 5c represents an output image 210c as generated according to a conventional method for morphological closing with modified erosion. The representation of the hairline crack 211c is significantly wider than the original hairline crack 211, and also not all fine branches are detected.

Figure 5D:
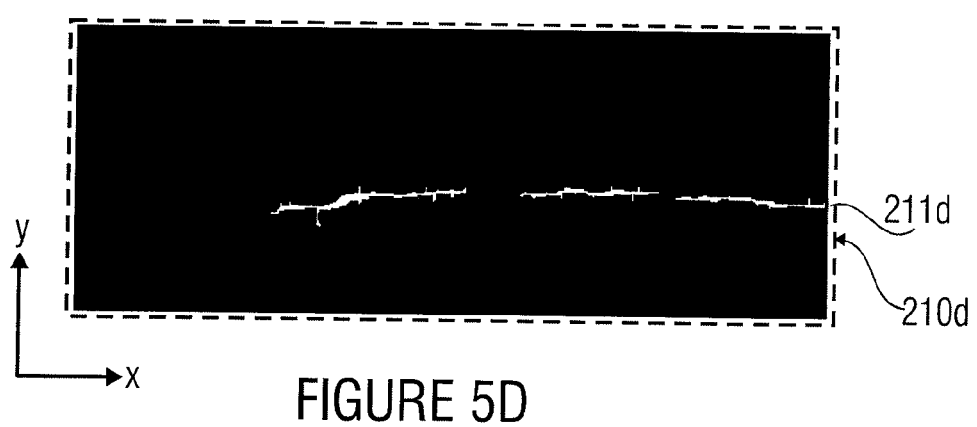
FIG. 5d is the image according to FIG. 5a after a last segmentation step of a conventional method for morphological closing according to a program library.

FIG. 5d represents an output image 210d of a method for morphological closing using morphological functions of a standard library. The representation of the hairline crack 211d is not completely detected. Three small hairline crack-type fragments can be detected, but not the whole hairline crack 211 corresponding to the representation in FIG. 5a. Both in FIG. 5b and in FIG. 5c and FIG. 5d, only the large fragments, i.e. fragments with more than 40 pixels in size, are represented.

With the method according to embodiments of the invention, the blobs or partial objects comprising the picture elements of the first type are analyzed prior to dilation. Thus, the blobs can be sorted and their number can be significantly reduced. Further, such extended partial objects having a specific geometrical shape, such as the shape of an elongated object, are further processed.

Additionally, and without influencing the results of the calculation, small partial objects up to a size of N pixels can be ignored, wherein N can depend on the image properties and the task of image processing. In FIG. 5b, N equals 4, so that only partial objects with a size of more than 4 pixels are further processed. Thus, a number of 125 detected extended partial objects is obtained in relation to the original image 211. Of these, only 27 are detected as linear or elongated objects.

Significantly more objects are detected in the conventional method with modified erosion, namely a number of 842, and an even higher number of 1230 are detected in the conventional method for morphological closing using morphological program libraries. In both conventional methods a very large number of crack fragments were detected, which is illustrated in the following table:

| Method | Number of detected objects | Number of crack fragments |
| --- | --- | --- |
| according to an embodiment of the invention (LMD), FIG. 5b | 125 (27) | 4 |
| with modified closing, FIG. 5c | 842 | 4 |
| with standard closing, FIG. 5d | 1230 | 17 |

It has to be noted that the area illustrated in FIGS. 5a-5d only represent approximately 20% of the whole surface of the working space. In so far, in conventional methods, a significant part of the processing time is used for blob retrieval and sorting.

A human being, however, perceives this hairline crack as a whole object. In this case, a method for geometrical aggregation can be applied. This means that individual fragments arranged such that they represent a mutual extension can be aggregated and illustrated as object to be detected. For geometrical aggregation, a simple method can be used that considers the direction of the cracks and the gap between marked picture elements of both fragments. The more small fragments are detected, the more difficult the geometrical aggregation becomes and, thus, conventional methods of morphological closing have a significant disadvantage here.

In the three methods for representing the images 210b, 210c and 210d, small partial objects having an object size below the pixel representability have been disregarded.

For comparing the processing speeds and the efficiency of embodiments of the invention in relation to conventional methods for morphological closing, 20 images of industrial manufacturing parts with complex spurious surface were examined. Ten of those images had no defects (cracks, rifts), while ten other images had surface errors in the shape of cracks. The whole surface to be inspected had a size of 700× 900 pixels. Initial segmentation was performed with a contrast factor of 0.78 for the two conventional methods and with the two contrast factors 0.78 and 0.89 for embodiments of the invention (LMD). The averaging parameters were the same. A comparison of the results is shown in the following table:

| Method | Average execution time | False positive detection | False negative detection | Number of other artefacts |
|---|---|---|---|---|
| according to an embodiment of the invention (LMD), FIG. 5b | 64.8 | 0 | 0 | 0 |
| with modified closing, FIG. 5c | 276.9 | 6 | 0 | 3 |
| with standard closing, FIG. 5d | 215.1 | 6 | 1 | 0 |

The average execution time is significantly shorter for embodiments of the invention. All cracks were detected by the inventive method and the conventional method with modified erosion. However, the conventional method with modified erosion provided too many wrongly detected cracks on images having no cracks. Also, many artefacts were detected on the cracked surfaces. Even when reducing the contrast factor to 0.75 for initial segmentation, several false negative results were obtained in the conventional method with modified erosion, while the inventive method still provided correct results.

With dark objects on a lighter background, the contrast factors are mostly selected smaller than or equal to 1. The "stronger" contrast also means a smaller contrast factor in this case, and with a "weaker" contrast, the contrast factor is higher. The stated values of 0.8 for the "strong contrast threshold" and 0.9 for the "weak contrast threshold" correspond to such an image type of dark objects on a light background. The two contrast factors 0.8 and 0.9 are optimized for the image type very fine cracks on a high-contrast background.

If the background were significantly calmer, the "low-contrast" threshold or both thresholds could be significantly increased. If the cracks were wider, i.e. more distinct and with correspondingly more contrast, the first contrast threshold (the first quotient) could be reduced. The first contrast threshold or the "strong" contrast threshold (high-contrast marking) can be selected depending on the state of the background, the width of the cracks and the degree of contrast of the other objects to be found. A range of 0.6 to 0.9 should be selected. The second contrast factor (quotient for the low-contrast marking) mostly depends on the background and is mostly selected to be less than 1. With the described sample, second contrast factors in the range of 0.93 provide good results. With a calm background, even a second contrast factor in the range of 0.99 to 1.00 can be used. Pairs of contrast factors should be selected where the difference between the first contrast factor stating the strong contrast and 1 is greater by a factor of approximately 2 to 3 than the difference between the second contrast factor indicating the weak contrast and 1.

The computing time of the conventional method for morphological closing (with modified erosion according to FIG. 5c or using a program library according to FIG. 5d) significantly exceeds the computing time of embodiments of the invention according to FIG. 5b. Also, the results of detecting cracks are not as good as in the embodiments of the invention. Many cracks have been illustrated in a heavily fragmented manner, see in particular FIG. 5d.

In other words, the method 10 can also be described with the following three steps: "Initial adaptive multithresholding of the original image with at least two different high-contrast and low-contrast thresholds", "Finding and describing all phenomena on a binary image with a high-contrast threshold. Producing a list of phenomena with features of a linear object based on this description" and "Extending the linear objects from the list one after the other, wherein the objects are not extended to all neighboring pixels, as in conventional dilation, but only to neighboring pixels indicated by low-contrast marking. As soon as the extension by low-contrast marking has reached another high-contrast object, this object is added to the extended object or merged with the same, respectively". In this description, the second 14 and third 16 steps are combined to one single step.

In a further embodiment, the method 10 can also be described as follows: Extending the high-contrast objects one after the other, successively until no new marked points are found. Thereby, no differentiation is made as to whether the marking is coarse or fine, i.e. whether extended partial objects are extended by picture elements of the first type (coarse or high-contrast) or of the second type (fine or low-contrast). It is only examined whether all coarsely marked pixels belong to the same object. If a marking of another high-contrast object is found, a bounding box can be connected to this object and the search is continued. The found object is simply deleted from the list.

The advantages of the method 10 are an increased speed of object detection, particularly in comparison with a conventional multithresholding method, as described under [2]. The advantages are, further, a significantly more accurate detection of the objects, particularly in comparison with a conventional morphological closing method, as described in [1].

Figures 6A, 6B:
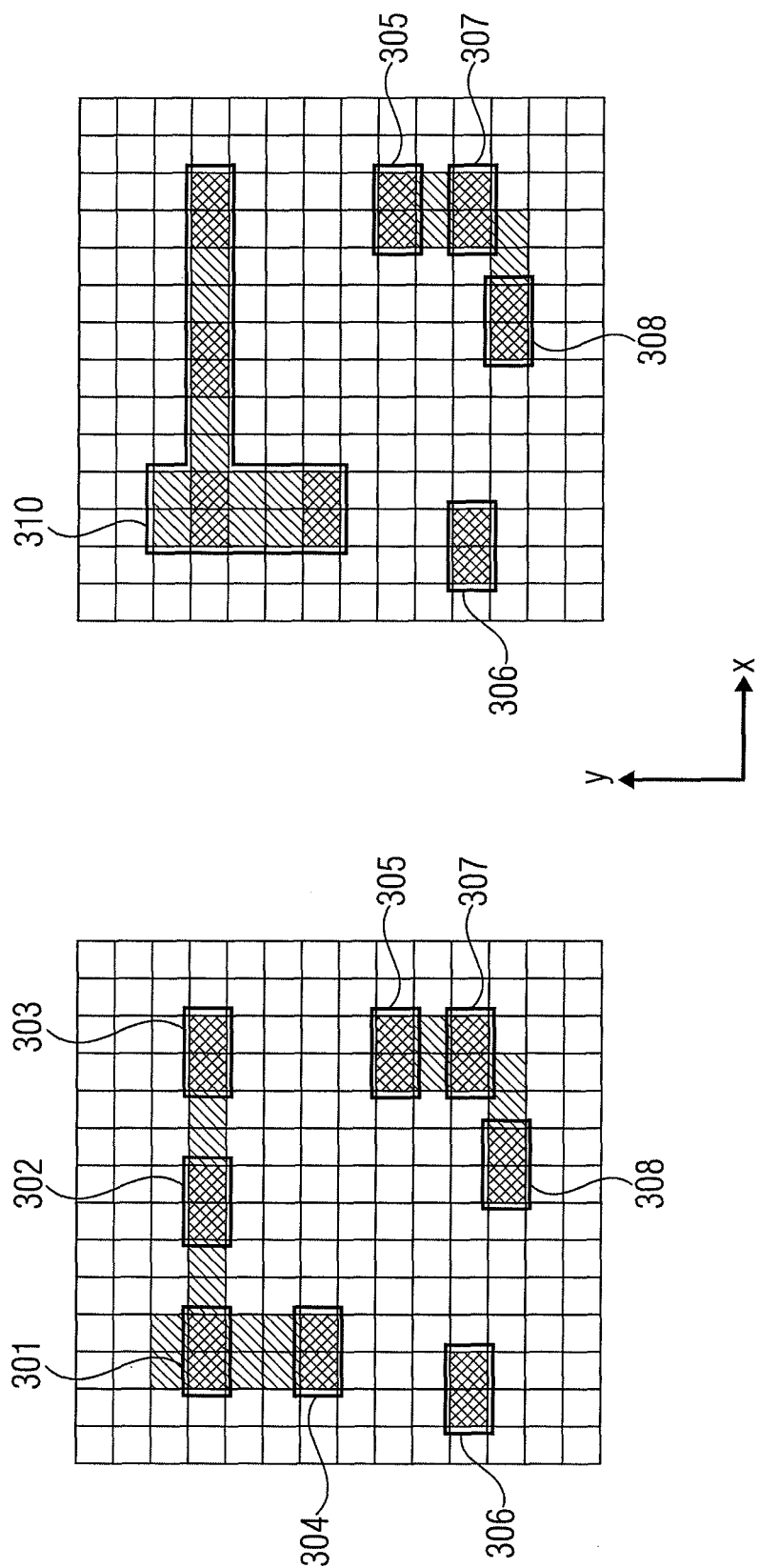
FIG. 6a-c is a schematical representation, by means of a pixel diagram, regarding a method for detecting an object according to a further embodiment of the invention.
Figure 6C:
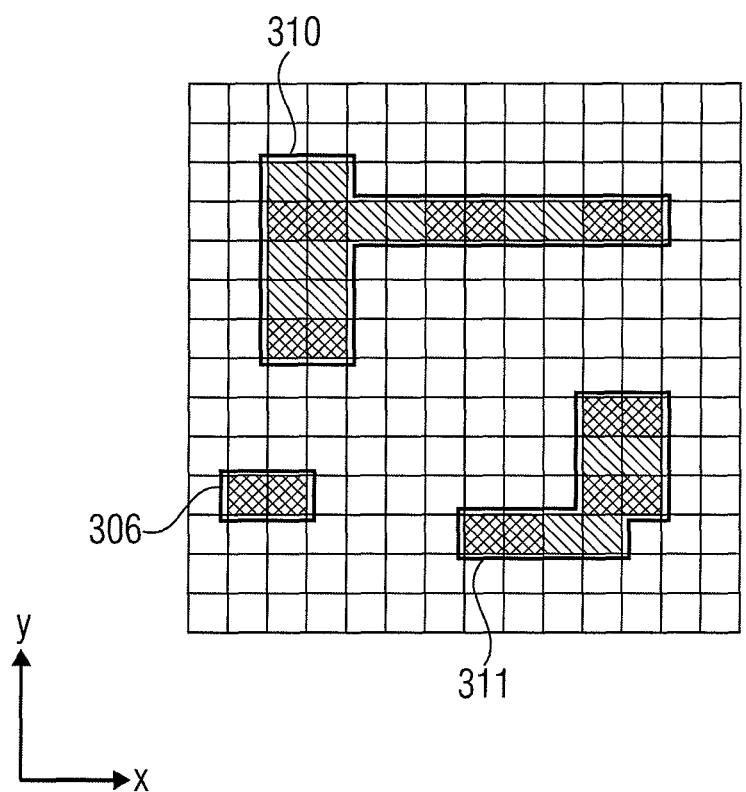

FIGS. 6a-6c show pixel diagrams of a method for detecting an object according to a further embodiment of the invention. Thereby, according to step 12 of method 10, first and second adaptive thresholds are determined for picture elements of the image, wherein the first and the second adaptive thresholds depend on an average intensity in a region around the respective picture element. Further, according to step 14 of method 10, partial objects of picture elements of a first type are determined, wherein the picture elements of the first type are obtained based on a comparison with the first adaptive threshold. In FIG. 6a, eight partial objects 301 to 308 have been determined. Based on these determined partial objects 301 to 308, a processing list is generated including list elements assigned to the determined partial objects 301 to 308. For example, in a first step, the processing list obtains elements {1,2,3,4,5,6,7,8} assigned to the determined partial objects 301 to 308. Elements assigned to different partial objects are included in the processing list.

Further, for example, only partial objects having a predetermined minimum size, for example, as indicated in FIG. 6a, a minimum size of 2 pixels, can be included in the processing list. Further, it is also possible that only those partial objects having an assigned predetermined geometrical shape or orientation are included in the processing list. For example, these can be partial objects having an elongated or linear shape or partial objects oriented to each other in a certain manner. For example, these can be partial objects having a main longitudinal axis oriented in a predetermined direction.

In a further step corresponding to the third step 16 of method 10, picture elements of a second type are determined, wherein the picture elements of the second type are obtained based on a comparison with the second adaptive threshold. In FIG. 6a, the picture elements of the first type are illustrated by double hatching, while the picture elements of the second type are illustrated by simple hatching. The fourth step 18 of method 10, combining a first and a second one of the partial objects to an extended partial object by picture elements of the second type when a minimum distance exists between the first and the second of the partial objects, wherein the object to be detected can be described by a sum of the partial objects of picture elements of the first type and/or the obtained partial objects, can be executed such that combining the partial objects is respectively performed using the processing list of assigned partial objects.

The processing list can be processed sequentially, for example beginning with the first element, or in random or another order. Thus, for example, the list elements of the processing list can be sorted according to the size of the partial objects, and processing can begin with the largest or smallest one of the partial objects. Other sorting rules can also be developed.

Connecting the partial objects by the processing list is shown in FIG. 6b. In a first step of connecting, the first element of the processing list assigned to the first partial object 301 is selected and connected to the second partial object 302, the third partial object 303 and the fourth partial object 304 by picture elements of the second type adjacent to the first partial object (for example by a four-neighborhood or an eight-neighborhood) for forming a first extended partial object 310. Thus, starting from the first partial object 301, all partial objects that can be connected to the first partial object 301 by picture elements of the second type are connected to the same. Thus, the list elements assigned to the first, second, third and fourth partial objects of the processing list can be deleted or marked as processed, and the next element of the processing list can be selected. This corresponds to the fifth partial object 305 that can be connected to neighboring partial objects by picture elements of the second type corresponding to FIG. 6c. In FIG. 6c, it can be seen that the fifth partial object 305, the seventh partial object 307 and the eighth partial object 308 have been combined to a second extended partial object 311. A further connection is not possible, since all picture elements of the second type are included in the connection. Elements 5, 7 and 8 can be deleted from the processing list or marked as processed. Thus, there is only one list element in the processing list corresponding to the sixth partial object 306. Since the same cannot be connected to further partial objects, the processing list can also delete the sixth list element or mark the same as processed. After the list is empty or marked as processed, respectively, the object to be detected can be described as the sum of the extended partial objects 310, 311, and the sixth partial object 306, that could not be connected to an extended partial object. Thus, the sixth partial object 306 is a partial object that is not connectable to a further partial object by picture elements of the second type, and it can remain as an individual partial object in the sum. The list elements whose assigned partial objects have been subjected to the step of connecting or that remain as individual partial objects can be deleted or marked as processed. Thus, the step of connecting can be executed until the processing list is empty or completely marked (as processed).

In this embodiment, in the step of connecting, a plurality of partial objects is connected by picture elements of the second type. In a further embodiment shown in FIG. 7, the step of connecting partial objects can also be executed such that only partial objects are connected to each other that can be connected to each other directly by picture elements of the second type, without being included in the connection by a further partial object.

Figure 7B:
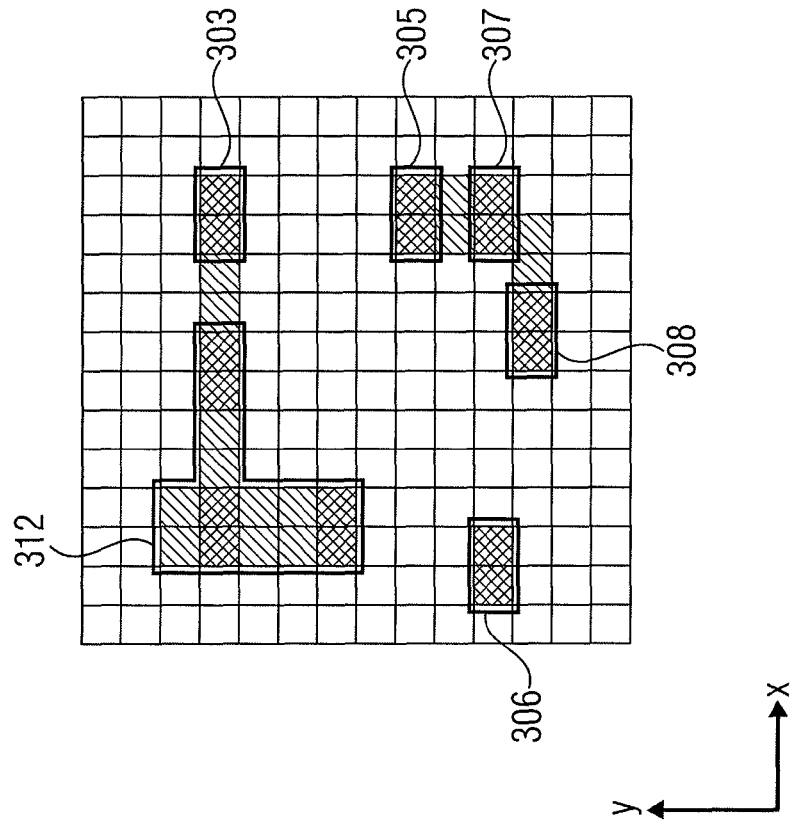
FIG. 7a-d is a schematical representation, by means of a pixel diagram, regarding a method for detecting an object according to a further embodiment of the invention.
Figure 7A:
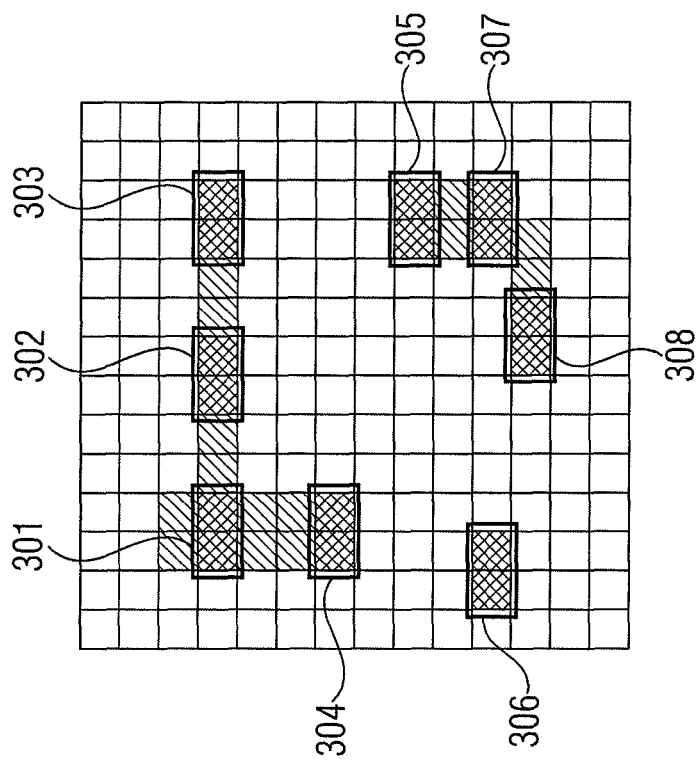

FIGS. 7a-7d show pixel diagrams of a method for detecting an object according to a further embodiment of the invention. The embodiment corresponds to the embodiment illustrated in FIG. 6, wherein the step of connecting partial objects is executed such that a partial object is first only connected to neighboring partial objects by picture elements of the second type that are directly adjacent to the partial object. FIG. 7a corresponds to FIG. 6a. Eight partial objects have been detected that are connectable by picture elements of the second type. Eight list elements of a processing list are assigned to the eight partial objects. In FIG. 7b, the first element of the list assigned to the first partial object 301 is selected for connecting the first partial object 301 to directly neighboring partial objects by picture elements of the second type. These are the second partial object 302 and the fourth partial object 304. These three partial objects are combined to a first extended partial object 312. Further, the list elements assigned to the first partial object 301, the second partial object 302 and the fourth partial object 304 are deleted from the processing list or marked as processed.

Figure 7D:
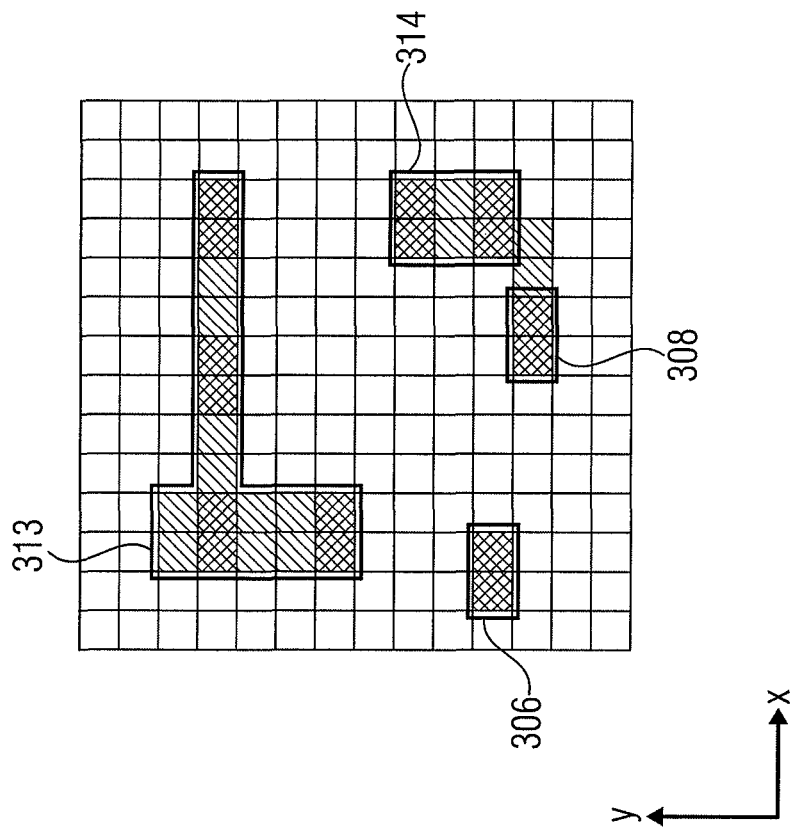
Figure 7C:
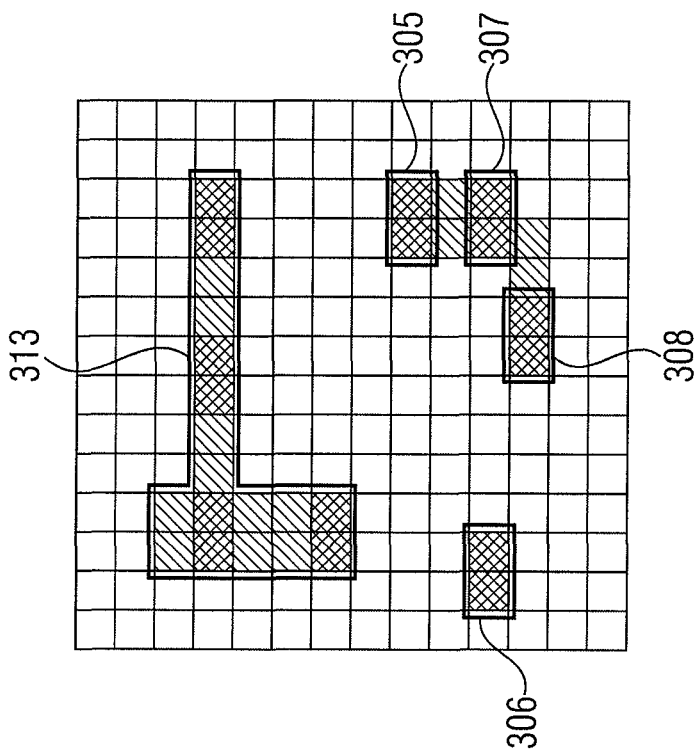

In a further step illustrated in FIG. 7c, the next list element of the processing list is selected. This corresponds to the third list element assigned to the third partial object 303. The third partial object 303 assigned to the third list element is now connected to further partial objects or extended partial objects, respectively, by picture elements of the second type. In this representation, the third partial object 303 is directly adjacent to the first extended partial object 312 so that a second extended partial object 313 results from the third partial object 303 and the first extended partial object 312. Since the third partial object has no further neighboring partial objects or extended partial objects that are connectable by picture elements of the second type, the third list element assigned to the third partial object is deleted from the processing list or marked as processed, respectively, and processing continues with the next list element. This is shown in FIG. 7d. The next list element of the processing list corresponds to the fifth list element assigned to the fifth partial object 305. In a next step, this fifth partial object 305 is connected to directly neighboring partial objects of the first type or to extended partial objects, respectively, by picture elements of the second type. Since the fifth partial object 305 has only one direct neighbor, namely the seventh partial object 307, the fifth partial object 305 and the seventh partial object 307 are combined to a third extended partial object 314. Then, the list elements assigned to the fifth partial object 305 and the seventh partial object 307 are deleted from the processing list or marked as processed, respectively, and the method continues with the next list element of the processing list. This is the sixth list element corresponding to the sixth partial object 306. Since this has no neighboring partial objects or extended partial objects that are connectable by picture elements of the second type, the sixth list element is also deleted from the processing list or marked as processed, respectively. Now, the processing list only has an eighth list element, which is assigned to the eighth partial object 308. In a further step, not illustrated in FIG. 7, the eighth partial object 308 is connected to the third extended partial object 314 by picture elements of the second type, and the eighth list element is deleted from the processing list or marked as processed, respectively. Thus, the processing list is empty or marked as processed, respectively, and the obtained extended partial objects or partial objects that could not be connected to partial objects, respectively, can be illustrated as objects to be detected.

In a further variation of the method, the processing list can be processed such that a partial object assigned to a list element of the processing list to be processed is only connected to a directly neighboring partial objects by picture elements of the second type, then the list elements of both partial objects are deleted from the processing list or marked as processed, respectively, and the process continues with the next free list element that is not marked as processed.

The partial objects or the extended partial objects, respectively, can also be referred to as fragments, that are included in the summation by size, shape and orientation for representing the object to be detected. A selection of the fragments regarding size, geometrical shape and orientation can be made in any step of the method, which means the partial objects can be selected with regard to size, shape and orientation, such that only those partial objects are further processed that have a predetermined size, a predetermined shape or a predetermined orientation, respectively. Further, also the extended partial objects can be selected with regard to size, shape and orientation, such that those extended partial objects deviating from a predetermined size, shape or orientation are not used for the representation of the object.

FIGS. 8 and 9 show in comparison the course of the general method with a closing procedure according to a software library (FIG. 8) and according to a further embodiment of the invention (FIG. 9).

Figure 8B:
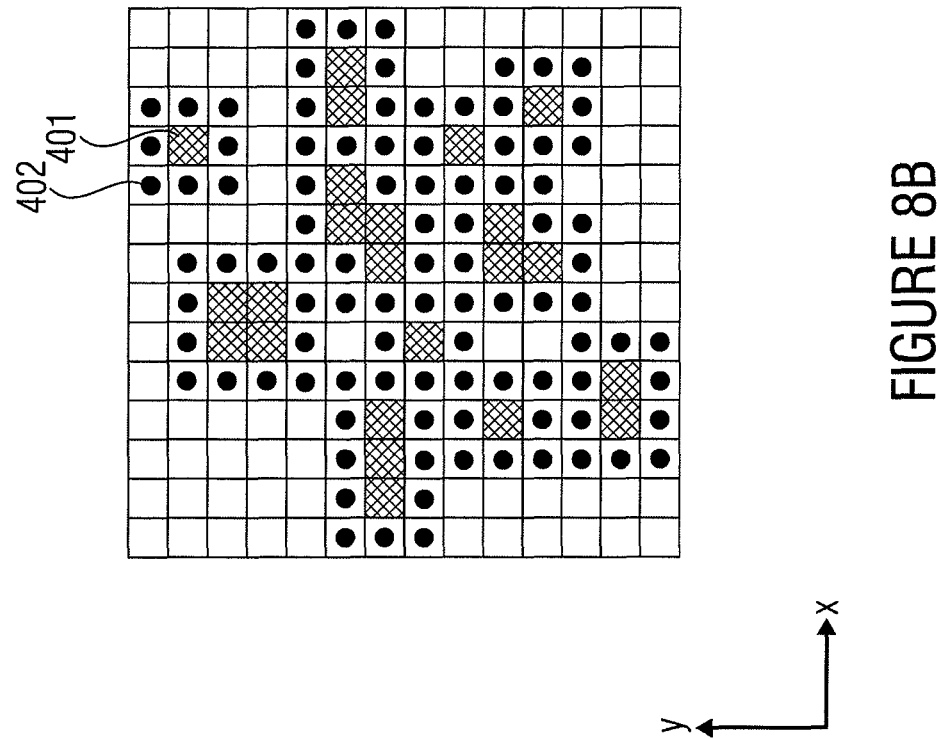
FIG. 8a-c is a schematical representation, by means of a pixel diagram, regarding a method for detecting an object according to a closing method.
Figure 8A:
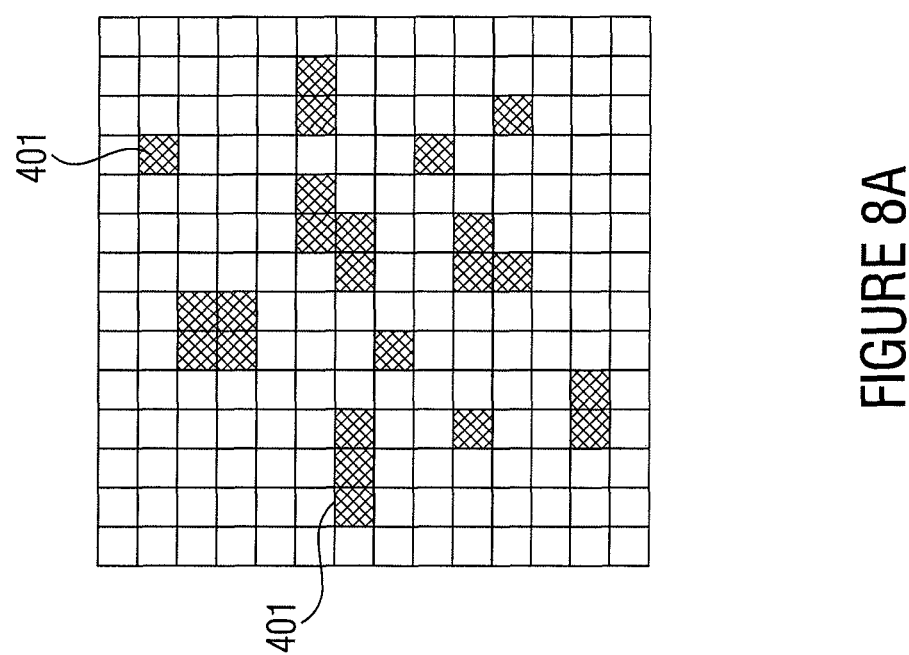
Figure 8C:
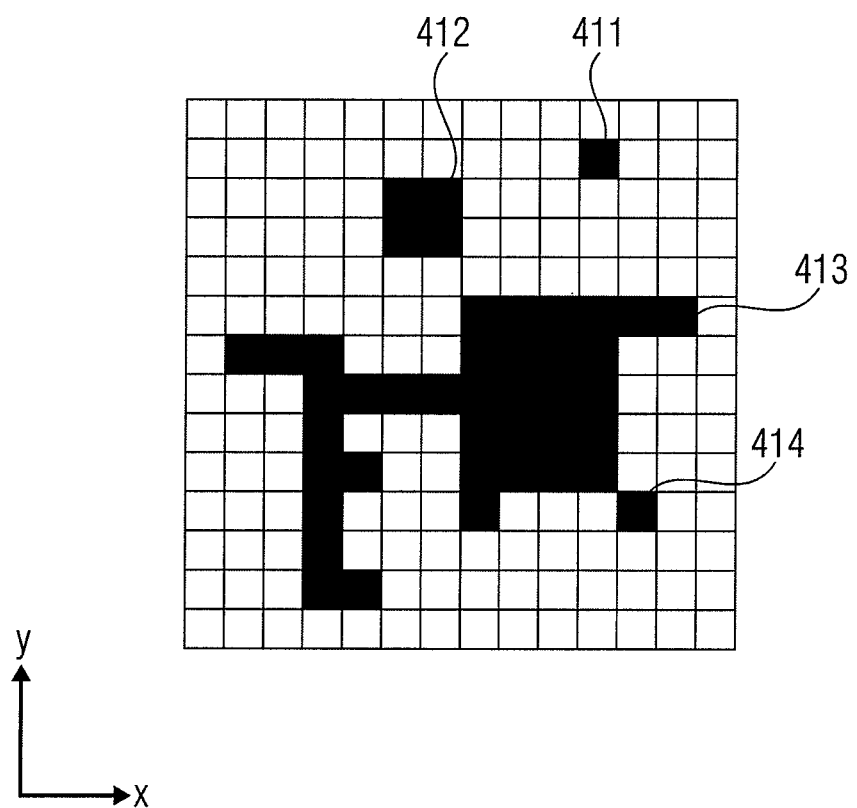

FIG. 8a shows a pixel diagram with picture elements (401) determined by an adaptive threshold method. FIG. 8b shows the binary image of FIG. 8a, which has been extended by a dilation step, wherein the picture elements are illustrated in a double-hatched manner after initial binarization (401) and marked picture elements (402) resulting from dilation are illustrated by a black dot. FIG. 8c shows the final binary image after an erosion step. According to a four-neighborhood rule, 4 objects (412-414) are found. When combining the objects according to an eight-neighborhood rule, the objects 413 and 414 are merged. The object 411, for example, is too small an object and is not considered further.

Figure 9B:
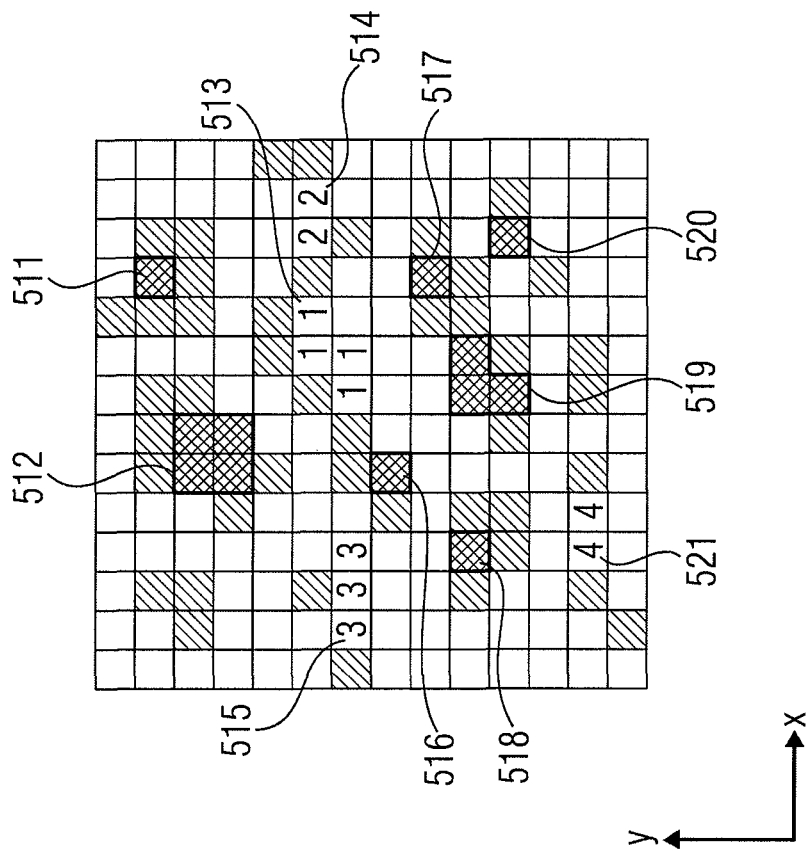
FIG. 9a-d is a schematical representation, by means of a pixel diagram, regarding a method for detecting an object according to a further embodiment of the invention.
Figure 9A:
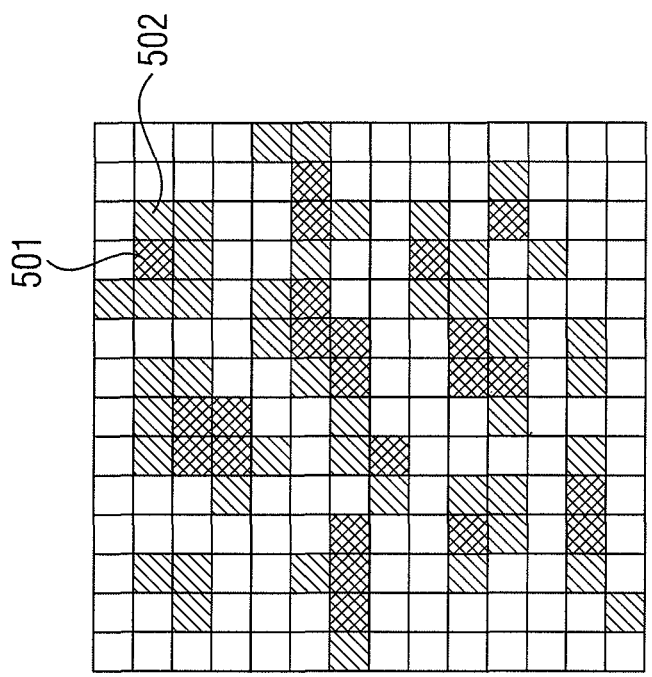

FIG. 9a shows the result of the initial thresholding with 2 thresholds, wherein the high-contrast threshold corresponds to the threshold according to FIG. 8a. High-contrast picture elements (501) are double-hatched, and low-contrast picture elements (502) are illustrated in a single-hatched manner.

FIG. 9b shows a pixel diagram after combining the found picture elements of the first type to (partial) objects, an analysis of their size and orientation and a generation of a list of the elongated objects. Here, such objects are included in the list that have a size of at least 2 pixels and have an unequal ratio between width and height. All in all, 11 objects are found (511-521), among them 4 objects (513-515 and 521) that are stored in the list. The pixels of these 4 objects (513-515 and 521) are marked correspondingly in FIG. 9b by 1, 2, 3 and 4.

Figure 9D:
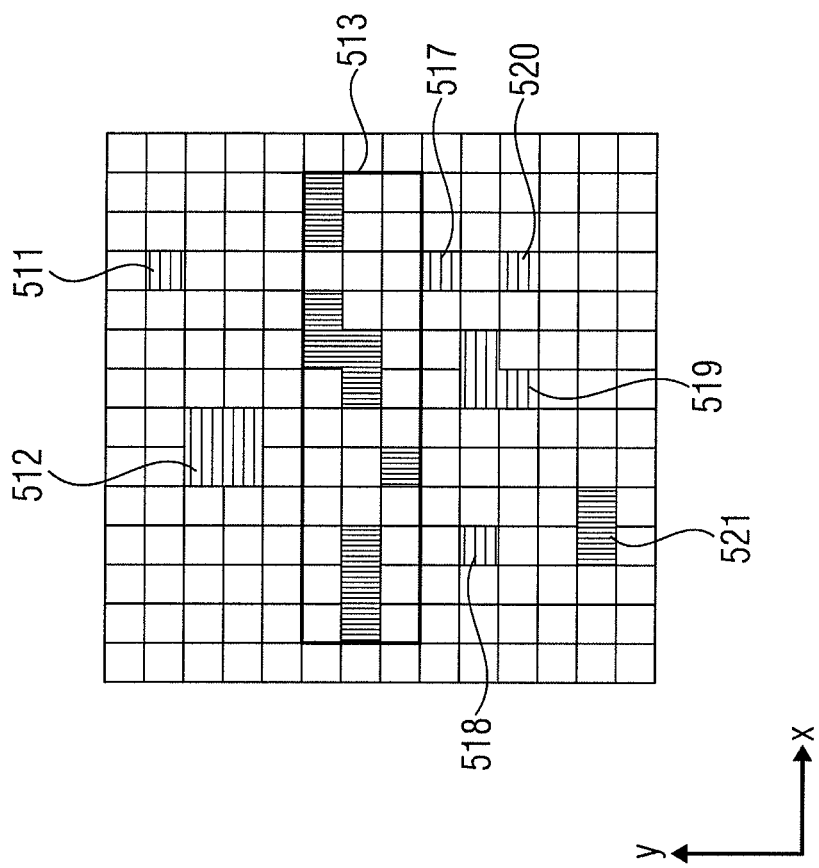
Figure 9C:
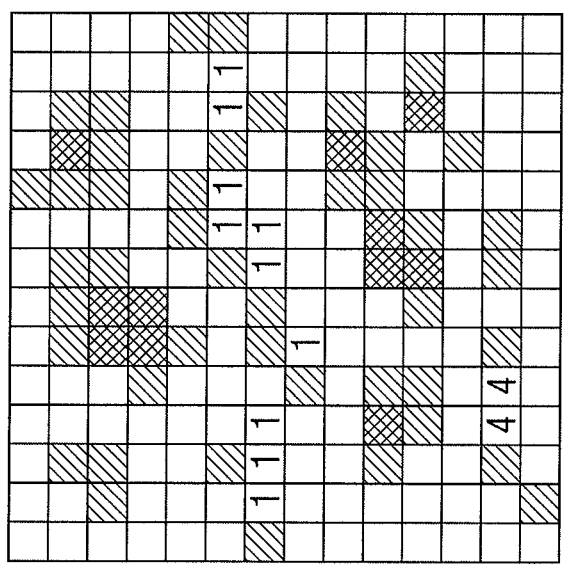

FIG. 9c shows the result of a successive extension of the object 513 illustrated in FIG. 9b (marked by 1) across all neighboring picture elements of the second and first types (according to an eight-neighborhood rule) by consistently deleting the connected objects from the processing list. Here, the object 516 has been combined with the object 513 (marked by 1), although it was not in the processing list. On the other hand, the object 521 illustrated in FIG. 9b (marked by 4) could not be connected and not be extended since it has no neighboring pixels of the second type.

FIG. 9d shows the resulting image of object detection according to the embodiment of the invention. Fragments 513-516 or partial objects, respectively, illustrated in FIG. 9b have been detected as a uniform object and combined with a bounding box to a large object or an extended partial object (indicated by 513). The rest of the objects are ignored due to their small size, including also the elongated object 521. Picture elements of the second type are not shown in the resulting image and are not integrated into the objects.

Thus, partial objects of picture elements of the first type are extended by successive extension by neighboring picture elements of the second and first types, wherein all obtained partial objects are combined to the extended partial object. If the successive extension reaches a further partial object, which is in the processing list, this further partial object is deleted from the list.

Depending on the circumstances, the inventive method can be implemented in hardware or in software. The implementation can be made on a digital memory medium, in particular a disc or a CD having electronically readable control signals that can cooperate such with a programmable computer system that the respective method is executed. Thus, generally, the invention also consists of a computer program product with a program code for performing the inventive method stored on a machine-readable carrier, when the computer program product runs on a computer. In other words, the invention can be realized as a computer program with a program code for performing the method, when the computer program runs on a computer. Embodiments of the invention can be designed in digital or analog logic, for example as electronic or photonic circuits.

In the present invention, a method for detecting an object on an image representable by picture elements comprises: determining first and second adaptive thresholds for picture elements of the image, wherein the first and second adaptive thresholds depend on an average intensity in a region around the respective picture element; determining partial objects of picture elements of a first type, wherein the picture elements of the first type are acquired based on a comparison with the first adaptive threshold; determining picture elements of a second type, wherein the picture elements of the second type are acquired based on a comparison with the second adaptive threshold; combining a first and a second one of the partial objects to an extended partial object by picture elements of the second type, wherein the object to be detected can be described by a sum of the partial objects of picture elements of the first type and/or the sum of the acquired extended partial objects.

In one embodiment, combining is performed by a successive extension via neighboring picture elements of the second type or via neighboring picture elements of the second and first type. In another embodiment of the present invention, the method comprises: combining the sum of the partial objects of picture elements of the first type and/or of the acquired extended partial objects for acquiring a representation of the object to be detected. In another embodiment, the partial objects of picture elements of the first type comprise at least a predetermined minimum number of picture elements.

In yet another embodiment, the sum of partial objects of picture elements of the first type and/or of acquired extended partial objects is formed of extended partial objects comprising a minimum number of picture elements. In a further embodiment, combining the first and second partial objects is performed using morphological dilation, wherein morphological dilation performs dilation by only using picture elements of the second type.

In one embodiment, combining the first and second partial objects comprises successively extending a first and/or second partial object by neighboring picture elements of the second type until at least a contiguous path of picture elements of the second type and/or picture elements of the first type between the first and second of the partial objects is acquired; and determining the extended partial object of the picture elements of the first and second partial objects and the picture elements of the second type used for the successive extension. In another embodiment, during successively extending the first and/or the second partial object, the neighboring picture elements of the second type are determined by using an eight-neighborhood relationship or by using a four-neighborhood relationship.

In another embodiment, the partial objects of picture elements of the first type are determined from neighboring picture elements of the first type by using a four-neighborhood relationship. In yet another embodiment, the first adaptive threshold further depends on a first contrast factor, and the second adaptive threshold further depends on a second contrast factor differing from the first contrast factor. In another embodiment, the first and second adaptive thresholds for picture elements of the image are determined by the following relationships:

$$T_1(x, y) = C_1 \frac{1}{N_{MN}} \sum_{m=-M}^{m=M} \sum_{n=-N}^{n=N} I(x-m, y-n),$$

$$T_2(x, y) = C_2 \frac{1}{N_{MN}} \sum_{m=-M}^{m=M} \sum_{n=-N}^{n=N} I(x-m, y-n),$$

wherein the picture elements of the image are illustrated by Cartesian coordinates x and y, I(x,y) designates an intensity of a picture element with the Cartesian coordinates x and y, $1/N_{MN}$ designates a weighting factor, $C_1$ the first contrast factor, $C_2$ the second contrast factor, $T_1(x,y)$ the first adaptive threshold and $T_2(x,y)$ the second adaptive threshold for the picture element with the Cartesian coordinates x and y.

In yet another embodiment, the sum of partial objects of picture elements of the first type and/or of acquired extended partial objects is only formed of partial objects of picture elements of the first type and/or of acquired extended partial objects with a predetermined geometrical shape or orientation to each other. In another embodiment, the predetermined geometrical shape comprises a main longitudinal axis. In another embodiment, the main longitudinal axis runs within a predetermined angle range.

In another embodiment, the sum of partial objects of picture elements of the first type and/or of acquired extended partial objects is only formed of partial objects of picture elements of the first type and/or of acquired extended partial objects, where a distance between individual ones of the partial objects and/or the extended partial objects does not exceed a predetermined maximum distance.

In yet another embodiment, the sum of partial objects of picture elements of the first type and/or of acquired extended partial objects is only formed of partial objects of picture elements of the first type and/or acquired extended partial objects that are adjacent to each other.

One embodiment comprises: generating a processing list with list elements, wherein one of the determined partial objects of picture elements of the first type is assigned to every list element; connecting a further partial object to the extended partial object by successively extending via neighboring picture elements of the second type or via neighboring picture elements of the second and first types; retaining the partial objects, which are not connectable to a further partial object by picture elements of the second type, as individual partial objects; marking or deleting those list elements whose assigned partial objects are subjected to connecting, or that are retained as individual partial objects; performing connecting until the processing list is empty or completely marked. In another embodiment, the partial objects assigned to the list elements have a predetermined minimum size. In a further embodiment, the partial objects assigned to the list elements are associated to a geometrical shape or orientation. In a further embodiment, the first partial object is selected as first list element from the processing list prior to the combining. In one embodiment, the method further comprises connecting a further partial object to the extended partial object by successively extending via neighboring picture elements of the second type or via neighboring picture elements of the second and first types.

In another embodiment, the method further comprises retaining the partial objects, which are not connectable to a further partial object by picture elements of the second type, as individual partial objects. In another embodiment, the method further comprises marking or deleting those list elements whose assigned partial objects are subjected to connecting, or that are retained as individual partial objects.

In yet another embodiment, the method further comprises: performing connecting until the processing list is empty or completely marked. In one embodiment, connecting comprises connecting a plurality of partial objects to each other by picture elements of the second type.

One embodiment comprises a computer program comprising a program code for performing the method for detecting an object on an image representable by picture elements, when the computer program runs on a computer.

In one embodiment, an apparatus for detecting an object on an image representable by picture elements comprises a determiner for determining first and second adaptive thresholds for picture elements of the image, wherein the first and second adaptive thresholds depend on an average intensity in a region around the respective picture element. a determiner for determining partial objects of picture elements of the first type, wherein the picture elements of the first type are acquired based on a comparison with the first adaptive threshold, a determiner for determining picture elements of the second type, wherein the picture elements of the second type are acquired based on a comparison with the second adaptive threshold; and a combiner for combining a first and a second one of the partial objects to an extended partial object by picture elements of the second type, when a minimum distance exists between the first and second one of the partial objects, wherein the object to be detected can be described by a sum of the partial objects of picture elements of the first type and/or acquired extended partial objects.

In one embodiment of the apparatus, the combiner is implemented for performing successive extension via neighboring picture elements of the second type or via neighboring picture elements of the second and first types.

In another embodiment, the combiner for combining a first and a second one of the partial objects further comprises: a combiner for combining the sum of the partial objects of picture elements of the first type and/or of the acquired extended partial objects for acquiring a representation of the object to be detected.

In a further embodiment, the partial objects of picture elements of the first type comprise at least a predetermined minimum number of picture elements. In yet another embodiment, the sum of the partial objects of picture elements of the first type and/or the acquired extended partial objects is formed of extended partial objects comprising a minimum number of picture elements. In yet another embodiment, the combiner for combining a first and a second one of the partial objects is implemented for performing combining of the first and the second one of the partial objects using morphological dilation, wherein morphological dilation performs dilation only by using picture elements of the second type.

In another embodiment, the combiner for combining a first and a second one of the partial objects further comprises an extender for successively extending a first and/or a second partial object by neighboring picture elements of the second type until at least a contiguous path of picture elements of the second type between the first and the second of the partial objects is acquired; and a determiner the extended partial object of the picture elements of the first and second partial objects and the picture elements of the second type used for the successive extension.

In another embodiment, the extender for successively extending a first and/or a second partial object is implemented for determining, during successively extending the first and/or the second partial object, the neighboring picture elements of the second type by using an eight-neighborhood relationship or by using a four-neighborhood relationship.

In further embodiment, the first adaptive threshold further depends on a first contrast factor, and wherein the second adaptive threshold further depends on a second contrast factor differing from the first contrast factor. In yet another embodiment, the first and second adaptive thresholds for picture elements of the image are determined by the following relationships:

$$T_1(x, y) = C_1 \frac{1}{N_{MN}} \sum_{m=-M}^{m=M} \sum_{n=-N}^{n=N} I(x-m, y-n),$$

$$T_2(x, y) = C_2 \frac{1}{N_{MN}} \sum_{m=-M}^{m=M} \sum_{n=-N}^{n=N} I(x-m, y-n),$$

wherein the picture elements of the image are illustrated by Cartesian coordinates x and y, I(x,y) designates an intensity of a picture element with the Cartesian coordinates x and y, $1/N_{MN}$ designates a weighting factor, $C_1$ the first contrast factor, $C_2$ the second contrast factor, $T_1(x,y)$ the first adaptive threshold and $T_2(x,y)$ the second adaptive threshold for the picture element with the Cartesian coordinates x and y.

In one embodiment, the apparatus comprises a generator for generating a processing list with list elements, wherein one of the determined partial objects of picture elements of the first type is assigned to every list element. In another embodiment, the partial objects assigned to the list elements comprise a predetermined minimum size.

In yet another embodiment, the partial objects assigned to the list elements are associated to a geometrical shape or orientation. In a further embodiment, the combiner is implemented for connecting a further partial object to the extended partial object, by successively extending via neighboring picture elements of the second type or via neighboring picture elements of the second and first types.

In a further embodiment, connecting is performed until the processing list is empty or completely marked. In yet another embodiment, during connecting, a plurality of partial objects are connected to each other by picture elements of the second type.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method for detecting an object on an image representable by picture elements (pixels), comprising:
   determining first and second adaptive thresholds for picture elements of the image, wherein the first and second adaptive thresholds depend on an average intensity in a region around the respective picture element, wherein the first adaptive threshold further depends on a first contrast factor, and wherein the second adaptive threshold further depends on a second contrast factor differing from the first contrast factor;
   determining partial objects of picture elements of a first type, wherein the picture elements of the first type are acquired based on a comparison with the first adaptive threshold;
   determining picture elements of a second type, wherein the picture elements of the second type are acquired based on a comparison with the second adaptive threshold;
   combining a first and a second one of the partial objects to an extended partial object by picture elements of the second type,
   wherein the object to be detected can be described by a sum of the partial objects of picture elements of the first type and/or the sum of the acquired extended partial objects.

2. The method according to claim 1, wherein combining is performed by a successive extension via neighboring picture elements of the second type or via neighboring picture elements of the second and first type.

3. The method according to claim 1, comprising:
   combining the sum of the partial objects of picture elements of the first type and/or of the acquired extended partial objects for acquiring a representation of the object to be detected.

4. The method according to claim 1, wherein the partial objects of picture elements of the first type comprise at least a predetermined minimum number of picture elements.

5. The method according to claim 1, wherein the sum of partial objects of picture elements of the first type and/or of acquired extended partial objects is formed of extended partial objects comprising a minimum number of picture elements.

6. The method according to claim 1, wherein combining the first and second partial objects is performed using morphological dilation, wherein morphological dilation performs dilation by only using picture elements of the second type.

7. The method according to claim 1, wherein combining the first and second partial objects comprises:
successively extending a first and/or second partial object by neighboring picture elements of the second type until at least a contiguous path of picture elements of the second type and/or picture elements of the first type between the first and second of the partial objects is acquired; and
determining the extended partial object of the picture elements of the first and second partial objects and the picture elements of the second type used for the successive extension.

8. The method according to claim 1, wherein the first and second adaptive thresholds for picture elements of the image are determined by the following relationships:

$$T_1(x, y) = C_1 \frac{1}{N_{MN}} \sum_{m=-M}^{m=M} \sum_{n=-N}^{n=N} I(x-m, y-n),$$

$$T_2(x, y) = C_2 \frac{1}{N_{MN}} \sum_{m=-M}^{m=M} \sum_{n=-N}^{n=N} I(x-m, y-n),$$

wherein the picture elements of the image are illustrated by Cartesian coordinates x and y, I(x,y) designates an intensity of a picture element with the Cartesian coordinates x and y, $1/N_{MN}$ designates a weighting factor, $C_1$ the first contrast factor, $C_2$ the second contrast factor, $T_1(x,y)$ the first adaptive threshold and $T_2(x,y)$ the second adaptive threshold for the picture element with the Cartesian coordinates x and y.

9. The method according to claim 1, wherein the sum of partial objects of picture elements of the first type and/or of acquired extended partial objects is only formed of partial objects of picture elements of the first type and/or of acquired extended partial objects with a predetermined geometrical shape or orientation to each other.

10. The method according to claim 1, wherein the sum of partial objects of picture elements of the first type and/or of acquired extended partial objects is only formed of partial objects of picture elements of the first type and/or of acquired extended partial objects, where a distance between individual ones of the partial objects and/or the extended partial objects does not exceed a predetermined maximum distance.

11. The method according to claim 1, wherein the sum of partial objects of picture elements of the first type and/or of acquired extended partial objects is only formed of partial objects of picture elements of the first type and/or acquired extended partial objects that are adjacent to each other.

12. The method according to claim 1, further comprising:
generating a processing list with list elements, wherein one of the determined partial objects of picture elements of the first type is assigned to every list element;
connecting a further partial object to the extended partial object by successively extending via neighboring picture elements of the second type or via neighboring picture elements of the second and first types;
retaining the partial objects, which are not connectable to a further partial object by picture elements of the second type, as individual partial objects;
marking or deleting those list elements whose assigned partial objects are subjected to connecting, or that are retained as individual partial objects; and/or
performing connecting until the processing list is empty or completely marked.

13. The method according to claim 12, wherein the partial objects assigned to the list elements have a predetermined minimum size or are associated to a geometrical shape or orientation.

14. The method according to claim 13, wherein connecting comprises connecting a plurality of partial objects to each other by picture elements of the second type.

15. A non-transitory computer readable medium having stored thereon a computer program comprising a program code for performing the method for detecting an object on an image representable by picture elements, when the computer program runs on a computer, the method comprising:
determining first and second adaptive thresholds for picture elements of the image, wherein the first and second adaptive thresholds depend on an average intensity in a region around the respective picture element, wherein the first adaptive threshold further depends on a first contrast factor, and wherein the second adaptive threshold further depends on a second contrast factor differing from the first contrast factor;
determining partial objects of picture elements of a first type, wherein the picture elements of the first type are acquired based on a comparison with the first adaptive threshold;
determining picture elements of a second type, wherein the picture elements of the second type are acquired based on a comparison with the second adaptive threshold; and
combining a first and a second one of the partial objects to an extended partial object by picture elements of the second type,
wherein the object to be detected can be described by a sum of the partial objects of picture elements of the first type and/or the sum of the acquired extended partial objects.

16. An apparatus for detecting an object on an image representable by picture elements, comprising:
a determiner for determining first and second adaptive thresholds for picture elements of the image, wherein the first and second adaptive thresholds depend on an average intensity in a region around the respective picture element, wherein the first adaptive threshold further depends on a first contrast factor, and wherein the second adaptive threshold further depends on a second contrast factor differing from the first contrast factor;
a determiner for determining partial objects of picture elements of the first type, wherein the picture elements of the first type are acquired based on a comparison with the first adaptive threshold;
a determiner for determining picture elements of the second type, wherein the picture elements of the second type are acquired based on a comparison with the second adaptive threshold; and
a combiner for combining a first and a second one of the partial objects to an extended partial object by picture elements of the second type, when a minimum distance exists between the first and second one of the partial objects, wherein the object to be detected can be described by a sum of the partial objects of picture elements of the first type and/or acquired extended partial objects.

17. The apparatus according to claim 16, wherein the combiner is implemented for performing successive extension via neighboring picture elements of the second type or via neighboring picture elements of the second and first types.

18. The apparatus according to claim 16, wherein the combiner for combining a first and a second one of the partial objects further comprises:
a combiner for combining the sum of the partial objects of picture elements of the first type and/or of the acquired extended partial objects for acquiring a representation of the object to be detected.

19. The apparatus according to claim 16, wherein the partial objects of picture elements of the first type comprise at least a predetermined minimum number of picture elements.

20. The apparatus according to claim 16, wherein the sum of the partial objects of picture elements of the first type and/or the acquired extended partial objects is formed of extended partial objects comprising a minimum number of picture elements.

21. The apparatus according to claim 16, wherein the combiner for combining a first and a second one of the partial objects is implemented for performing combining of the first and the second one of the partial objects using morphological dilation, wherein morphological dilation performs dilation only by using picture elements of the second type.

22. The apparatus according to claim 16, wherein the combiner for combining a first and a second one of the partial objects further comprises:
an extender for successively extending a first and/or a second partial object by neighboring picture elements of the second type until at least a contiguous path of picture elements of the second type between the first and the second of the partial objects is acquired; and
a determiner for determining the extended partial object of the picture elements of the first and second partial objects and the picture elements of the second type used for the successive extension.

23. The apparatus according to claim 22, wherein the extender for successively extending a first and/or a second partial object is implemented for determining, during successively extending the first and/or the second partial object, the neighboring picture elements of the second type by using an eight-neighborhood relationship or by using a four-neighborhood relationship.

24. The apparatus according to claim 16, wherein the first and second adaptive thresholds for picture elements of the image are determined by the following relationships:

$$T_1(x, y) = C_1 \frac{1}{N_{MN}} \sum_{m=-M}^{m=M} \sum_{n=-N}^{n=N} I(x - m, y - n),$$

$$T_2(x, y) = C_2 \frac{1}{N_{MN}} \sum_{m=-M}^{m=M} \sum_{n=-N}^{n=N} I(x - m, y - n),$$

wherein the picture elements of the image are illustrated by Cartesian coordinates x and y, I(x,y) designates an intensity of a picture element with the Cartesian coordinates x and y, $1/N_{MN}$ designates a weighting factor, $C_1$ the first contrast factor, $C_2$ the second contrast factor, $T_1(x,y)$ the first adaptive threshold and $T_2(x,y)$ the second adaptive threshold for the picture element with the Cartesian coordinates x and y.

25. The apparatus according to claim 16, comprising:
a generator for generating a processing list with list elements, wherein one of the determined partial objects of picture elements of the first type is assigned to every list element.

26. The apparatus according to claim 25, wherein the partial objects assigned to the list elements comprise a predetermined minimum size.

27. The apparatus according to claim 25, wherein the partial objects assigned to the list elements are associated to a geometrical shape or orientation.

28. The apparatus according to claim 25, wherein the combiner is implemented for connecting a further partial object to the extended partial object, by successively extending via neighboring picture elements of the second type or via neighboring picture elements of the second and first types.

29. The apparatus according to claim 25, wherein connecting is performed until the processing list is empty or completely marked.

30. A method for detecting an object on an image representable by picture elements, comprising:
determining first and second adaptive thresholds for picture elements of the image, wherein the first and second adaptive thresholds depend on an average intensity in a region around the respective picture element;
determining partial objects of picture elements of a first type, wherein the picture elements of the first type are acquired based on a comparison with the first adaptive threshold;
generating a processing list with list elements, wherein one of the determined partial objects of picture elements of the first type is assigned to every list element, wherein the partial objects assigned to the list elements comprise a predetermined minimum size or are associated to a geometrical shape or orientation;
determining picture elements of a second type, wherein the picture elements of the second type are acquired based on a comparison with the second adaptive threshold;
connecting a plurality of the partial objects to an extended partial object by means of picture elements of the second type,
marking or deleting those list elements whose assigned partial objects are subjected to connecting; and
performing connecting until the processing list is empty or completely marked;
wherein the object to be detected can be described by a sum of the partial objects of picture elements of the first type and/or the sum of the acquired extended partial objects.

31. The method according to claim 30, further comprising one of the following steps:
connecting a further partial object to the extended partial object by successively extending via neighboring picture elements of the second type or via neighboring picture elements of the second and first types;
retaining the partial objects, which are not connectable to a further partial object by picture elements of the second type, as individual partial objects; and
marking or deleting those list elements that are retained as individual partial objects.

32. The method according to claim 31, wherein the partial objects assigned to the list elements comprise a predetermined minimum size and are associated to a geometrical shape or orientation.

* * * * *